United States Patent
Onoue et al.

(10) Patent No.: US 11,373,334 B2
(45) Date of Patent: Jun. 28, 2022

(54) CAMERA SETTING ASSIST SYSTEM AND CAMERA SETTING ASSIST METHOD

(71) Applicant: PANASONIC I-PRO SENSING SOLUTIONS CO., LTD., Fukuoka (JP)

(72) Inventors: Tsutomu Onoue, Fukuoka (JP); Nobuyuki Eguchi, Fukuoka (JP); Akihiro Akiyama, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 17/005,922

(22) Filed: Aug. 28, 2020

(65) Prior Publication Data

US 2021/0074022 A1  Mar. 11, 2021

(30) Foreign Application Priority Data

Sep. 6, 2019 (JP) .............................. JP2019-163100

(51) Int. Cl.
*G09G 5/00* (2006.01)
*G06T 7/80* (2017.01)
(Continued)

(52) U.S. Cl.
CPC .................. *G06T 7/80* (2017.01); *G06T 7/62* (2017.01); *G06T 11/60* (2013.01); *G06T 2207/30201* (2013.01); *G06T 2207/30252* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

2004/0101166 A1* 5/2004 Williams .................. G01P 3/38
  382/104
2009/0139401 A1 6/2009 Takamizawa
(Continued)

FOREIGN PATENT DOCUMENTS

JP 2017-135531 A 8/2017
WO 2006/132049 A1 12/2006
(Continued)

OTHER PUBLICATIONS

Japanese Office Action, dated May 11, 2021, for Japanese Application No. 2019-163100, 4 pages, (with English Translation).

*Primary Examiner* — Gordon G Liu
(74) *Attorney, Agent, or Firm* — Seed IP Law Group LLP

(57) ABSTRACT

A terminal apparatus transmits, to a server, setting information including specification information of a camera based on input manipulation of the user, environment information indicating an environment in which the camera is installed, and a map image of a place where the camera is installed. The server calculates a capturing area of the camera in the map image, places a subject model that serves as a capturing target of the camera at a prescribed position in the capturing area and generates a synthesized image, generates a face image and a whole body image of the subject model located at the prescribed position that is inferred to be captured by the camera, transmits the synthesized image and the face image and the whole body image of the subject model to the terminal apparatus. The terminal apparatus displays the synthesized image, the face image and the whole body image of the subject model.

17 Claims, 13 Drawing Sheets

(51) Int. Cl.
*G06T 11/60* (2006.01)
*G06T 7/62* (2017.01)

(58) Field of Classification Search
USPC .......................................... 345/633
See application file for complete search history.

(56) References Cited

U.S. PATENT DOCUMENTS

| | | | |
|---|---|---|---|
| 2015/0302256 A1 | 10/2015 | Ikeda | |
| 2015/0317522 A1* | 11/2015 | Ikeda | H04N 7/18 |
| | | | 348/218.1 |
| 2018/0101194 A1* | 4/2018 | Wakako | H04N 1/00106 |
| 2020/0105123 A1* | 4/2020 | Davies | G08B 13/19669 |
| 2020/0139077 A1* | 5/2020 | Biradar | G06K 9/00302 |

FOREIGN PATENT DOCUMENTS

| | | |
|---|---|---|
| WO | 2014/087621 A1 | 6/2014 |
| WO | 2014/087622 A1 | 6/2014 |

\* cited by examiner

FIG. 8

| No. | Model | Title | Resolution | Compression | Rate | Quality | PPM | bps |
|---|---|---|---|---|---|---|---|---|
| 1 | WV-S1131 | Camera1 | 1280x960 | H.265 | 10ips | FQ | 160 | 640 |
| 2 | WV-X4171 | Camera2 | 1280x1280 | H.265 | 10ips | FQ | 163 | 768 |
| 3 | WV-X4171 | Camera3 | 1280x1280 | H.265 | 10ips | FQ | 163 | 768 |
| 4 | WV-S6130 | Camera4 | 1280x960 | H.265 | 10ips | FQ | 321 | 640 |
| 5 | WV-S2550 | Camera5 | 1280x960 | H.265 | 10ips | FQ | 262 | 640 |

LST1

CAMERA SETTING ASSIST SYSTEM AND CAMERA SETTING ASSIST METHOD

BACKGROUND OF THE INVENTION

1. Field of the Invention

The present disclosure relates to a camera setting assist system and a camera setting assist method.

2. Background Art

JP-A-2017-135531 discloses a security camera setting assist apparatus for determining an installation location of a camera in a surveillance target space. This security camera setting assist apparatus receives setting information including an angle of view required for a camera to be installed in a surveillance target space and a specification of the camera, determines a distance range where shooting with the angle of view required for the camera on the basis of the received setting information, and projects a projection image at a surveillance location in the space. In doing so, the security camera setting assist apparatus generates, for each of plural positions included in the distance range, a reference image for a model image so that the angle of view of the model image projected at the surveillance location when this position is positioned with respect to the surveillance location becomes suitable for the angle of view required for the camera, extracts, from the reference images for the respective positions, a reference image corresponding to a distance between the surveillance location and the security camera setting assist apparatus brought into the space, and generates a projection image according to an angle of projection from the security camera setting assist apparatus brought into the space to the surveillance location on the basis of the reference image.

SUMMARY OF THE INVENTION

However, in the above-described configuration of JP-A-2017-135531, no consideration is given to states (indoor/outdoor, shooting time, and weather, etc.) relating to a surveillance target space as a place in which to install a camera. As a result, there may occur an event that an image taken by an actual camera installed in the surveillance target space does not satisfy a specification (brightness and image quality, etc.) required by a user.

The concept of the present disclosure has been conceived in view of the above circumstances in the art, and an object of the invention is therefore to provide a camera setting assist system and a camera setting assist method that assist a user in checking a specification relating to the image quality of an image captured by a camera by presenting a captured image that is suitable for an environment in which to install the camera.

The disclosure provides a camera setting assist system including a terminal apparatus configured to receive an input manipulation of a user and a server that is communicatively connected to the terminal apparatus, wherein the terminal apparatus transmits, to the server, setting information including specification information of a camera based on input manipulation of the user, environment information indicating an environment in which the camera is installed, and a map image of a place where the camera is installed, the server calculates a capturing area of the camera in the map image based on the setting information and the environment information, places a subject model that serves as a capturing target of the camera at a prescribed position in the capturing area and generates a synthesized image by superimposing the capturing area and the subject model on the map image, generates a face image and a whole body image of the subject model located at the prescribed position that is inferred to be captured by the camera based on the setting information and the environment information; and transmits the synthesized image and the face image and the whole body image of the subject model to the terminal apparatus, and the terminal apparatus displays the synthesized image, the face image and the whole body image of the subject model.

The disclosure also provides a camera setting assist method performed by a terminal apparatus configured to receive an input manipulation of a user and a server that is communicatively connected to the terminal apparatus, the camera setting assist method including, the steps of calculating a capturing area of a camera in a map image based on setting information including specification information of the camera based on input manipulation of the user and environment information indicating an environment in which the camera is installed, placing a subject model that serves as a capturing target of the camera at a prescribed position in the capturing area and generating a synthesized image by superimposing the capturing area and the subject model on a map image of a place where the camera is installed, generating a face image and a whole body image of the subject model located at the prescribed position that is inferred to be captured by the camera based on the setting information and the environment information; and displaying the synthesized image, the face image and the whole body image of the subject model.

The disclosure makes it possible to assist a user in checking a specification relating to the image quality of an image captured by a camera by presenting a captured image that is suitable for an environment in which to install the camera.

BRIEF DESCRIPTION OF THE DRAWINGS

FIG. 8 shows an example manner of display of the camera setting information list;

DETAILED DESCRIPTION OF THE EXEMPLARY EMBODIMENT

Background Leading to Embodiment

Figure 1:
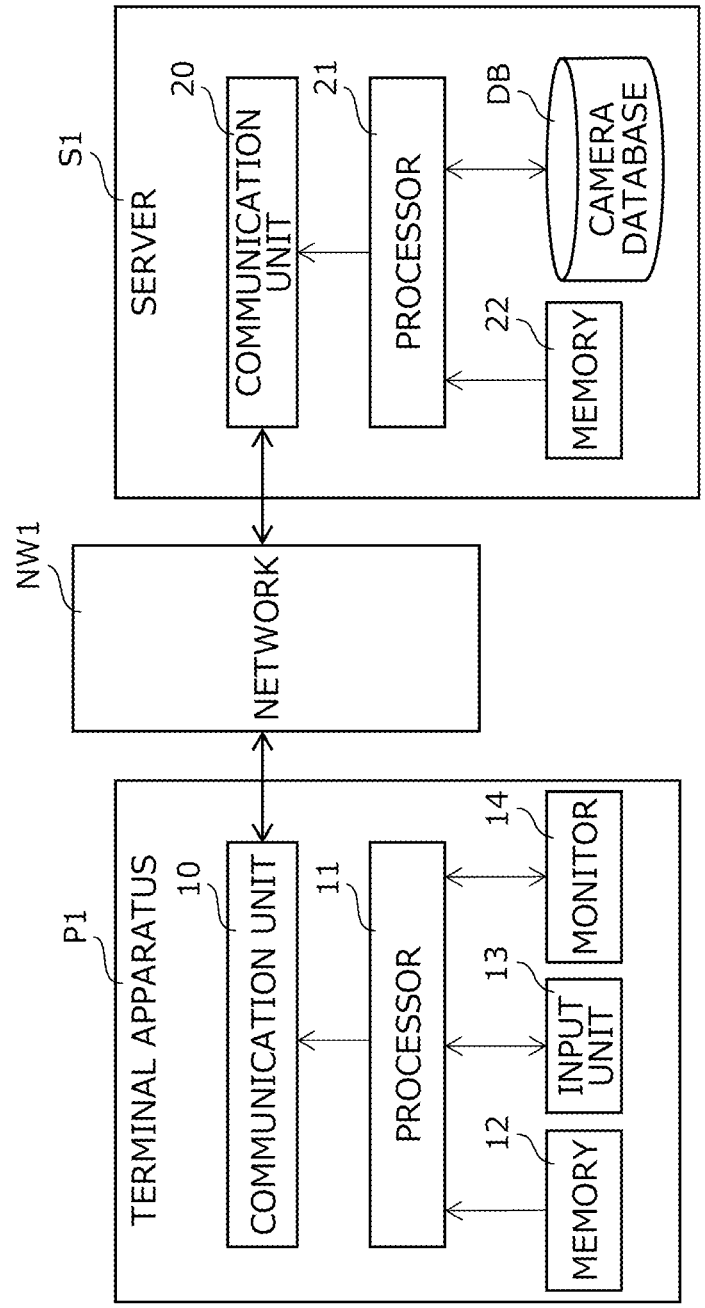
FIG. 1 is a block diagram showing an example internal configuration of a camera setting assist system according to a first embodiment.

A security camera setting assist apparatus and program for determining an installation location of a camera in a surveillance target space are known. The security camera setting assist apparatus or program determines a distance range where shooting by the camera is possible on the basis of an angle of view required for the camera and setting information including a specification of the camera and projects a projection image at a surveillance location in the space. The security camera setting assist apparatus or program extracts a reference image for each of distances of plural positions included in the determined distance range and generates a projection image on the basis of each reference image and an angle of projection from the apparatus to the surveillance location.

However, in the above-described security camera setting assist apparatus and program, no consideration is given to states (indoor/outdoor, shooting time, and weather, etc.) relating to a surveillance target space. As a result, there may occur an event that an image taken by an actual camera installed in the surveillance target space does not satisfy a specification (brightness and image quality, etc.) required by a user.

In view of the above, a camera setting assist system and a camera setting assist method according to an embodiment have been conceived that assist a user in checking a specification relating to the image quality of an image captured by a camera by presenting a captured image that is suitable for an environment in which to install the camera.

An embodiment as a specific disclosure of the configuration and workings of a camera setting assist system and a camera setting assist method will be described in detail by referring to the drawings when necessary. However, unnecessarily detailed descriptions may be avoided. For example, detailed descriptions of already well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

Embodiment 1

FIG. 1 is a block diagram showing an example internal configuration of a camera setting assist system 100 according to a first embodiment. The camera setting assist system 100 is, for example, a system for simulating an image to be captured when a camera is installed in a prescribed environment at a prescribed location and for assisting a manner of camera installation desired by a user. The camera setting assist system 100 is configured so as to include a terminal apparatus P1, a network NW1, and a server S1. Although the camera to be employed in the first embodiment is, for example, a surveillance camera, the use and the kind of the camera is not limited to it.

The terminal apparatus P1 is equipped with an interface (e.g., keyboard, mouse, or touch panel display) capable of receiving a user input manipulation. The terminal apparatus P1 is connected to the server S1 via the network NW1 so as to be able to communicate with the server S1 and transmits a signal generated on the basis of a user input manipulation to the server S1 over the network NW1. Furthermore, the terminal apparatus P1 displays, on a monitor 14, a synthesized image received from the server S1 over the network NW1. The terminal apparatus P1 is configured so as to include a communication unit 10, a processor 11, a memory 12, an input unit 13, and the monitor 14.

The communication unit 10 is configured using a communication interface circuit for transmitting and receiving data or information to and from the server S1 over the network NW1. The communication unit 10 transmits a signal generated by the processor 11 on the basis of a user input manipulation to the server S1 over a wired or wireless communication network and outputs, to the processor 11, an instruction to display, for example, a synthesized image received from the server S1.

The processor 11 is configured using, for example, a CPU (central processing unit) or an FPGA (field-programmable gate array) and performs various kinds of processing and control cooperating with the memory 12. More specifically, the processor 11 realizes functions of the individual units by referring to programs and data held by the memory 12 and running the programs. The term "functions of the individual units" as used herein means, for example, a function of generating a signal input in the input unit 13 on the basis of a user input manipulation and a function of displaying a synthesized image received from the server S1 on the monitor 14.

The memory 12 has a RAM (random access memory) as a work memory that is used when, for example, the processor 11 performs each kind of processing and a ROM (read-only memory) that stores the programs that prescribe how the processor 11 should operate and various data. Data or information generated or acquired by the processor 11 is stored in the RAM temporarily. The programs that prescribe how the processor 11 should operate are written in the ROM.

The input unit 13, which is a user interface for detecting, for example, a user input manipulation, is configured using a mouse, a keyboard, a touch panel, or the like. The input unit 13 receives, on the basis of user input manipulations, camera-related setting information (e.g., an installation angle of view and a PPM (pixels per meter) or PPF (pixels per foot) required by a user) specified (selected) by the user and environment information indicating an environment in which to install the camera (e.g., outdoor or indoor, with or without illumination, and weather (fine or cloudy)), converts them into signals, and outputs the signals to the processor 11. Furthermore, the input unit 13 outputs, to the processor 11, a map image IMG of a place where to install the camera that has been uploaded by the user.

The PPM means a pixel density calculated by dividing the number of horizontal pixels indicating a maximum horizontal resolution of the camera by a distance (in meters) to a subject that is calculated on the basis of a horizontal distance to the subject and an installation height of the camera. On the other hand PPF is a pixel density calculated by dividing the number of horizontal pixels indicating a maximum horizontal resolution of the camera by a distance (in feet) to a subject that is calculated on the basis of a horizontal distance to the subject and an installation height of the camera.

A PPM value in a range of 240 to 630 is suitable for face authentication of a subject, a PPM value larger than or equal to 300 is a resolution that enables recognition of looks of a subject, and a PPM value larger than or equal to 100 that enables recognition of the entire body and an action of a subject. Where the subject is a license plate, license plate information can be read if the PPM is larger than or equal to 240 and the license plate can be recognized visually by a user if the PPM is larger than or equal to 150. The PPM value ranges mentioned above are just examples and it goes without saying that they vary depending on the performance of a camera and its installation environment.

The map image IMG as mentioned above is a map or a sketch, generated using a designing assist tool such as a CAD (computer-aided design), of a room, a parking lot, or the like where a user wants to install the camera. A map image IMG is uploaded to the terminal apparatus P1 by a user and transmitted to the server S1 over the network NW1.

The monitor is configured using a display such as an LCD (liquid crystal display) or an organic EL (electroluminescence) display. The monitor 14 displays a simulation image including a synthesized image received from the server S1.

The network NW1 is a wired or wireless network that connects the terminal apparatus P1 and the server S1 so that they can communicate with each other. The wireless communication network is provided according to a wireless communication standard such as wireless LAN (local area network), wireless WAN (wide area network), 4G (4th generation mobile communication system), 5G (5th generation mobile communication system), or Wi-Fi®.

The server S1 simulates a manner of installation of the camera on the basis of signals received from the terminal apparatus P1 over the network NW1 and generates a simulation result including an image of a subject model captured by the camera installed. The server S1 transmits the generated simulation result to the terminal apparatus P1 over the network NW1. The server S1 is configured so as to include a communication unit 20, a processor 21, a memory 22, and a camera database DB.

The communication unit 20 is configured using a communication interface circuit for transmitting and receiving data or information to and from the terminal apparatus P1 over the network NW1. The communication unit 20 outputs, to the processor 21, a signal generated on the basis of a user input manipulation and received from the terminal apparatus P1 over a wired or wireless communication network and transmits a simulation result generated by the processor 21 to the terminal apparatus P1.

The processor 21 is configured using, for example, a CPU or an FPGA and performs various kinds of processing and control cooperating with the memory 22. More specifically, the processor 21 realizes functions of the individual units by referring to programs and data held by the memory 22 and running the programs. The term "functions of the individual units" as used herein means, for example, a function of performing a control using a signal generated on the basis of a user input manipulation and received from the terminal apparatus P1, a function of calculating a capturing area of the camera on the basis of received camera setting information or environment conditions, and a function of generating a face image and an image of the entire body of the subject model or a license plate image on the basis of received environment information and camera setting information.

The processor 21 receives, from the communication unit 20, a signal (i.e., a signal indicating camera setting information or conditions relating to an environment in which to install the camera) generated on the basis of a user input manipulation and received from the terminal apparatus P1. The processor 21 requests, on the basis of the received signal, the camera database DB to retrieve information relating to a camera specified (selected) by a user a signal generated on the basis of a user input manipulation and received from the terminal apparatus P1. The processor 21 calculates a capturing area of the camera on the basis of the information relating to the camera received from the camera database DB and received camera setting information and information indicating an environment in which to install the camera.

The processor 21 superimposes a calculated capturing area of the camera and an icon indicating an installation location on a map image IMG at desired positions or positions specified (selected) by a user. Furthermore, the processor 21 superimposes a subject model that would be captured by the camera in the calculated capturing area of the camera in the map image IMG The processor 21 generates a synthesized image in which the icon indicating the camera installation location, the camera capturing area, and the subject model are superimposed on the map image IMG and outputs it to the communication unit 20. The processor 21 may first superimpose the icon indicating the camera installation location at a position specified (selected) by the user and then calculate a camera capturing area and superimposes it on the map image IMG.

The processor 21 generates a face image and an image of the entire body of the subject model and a license plate image that would be captured by the camera and are suitable for the environment in which to install the camera. The processor 21 outputs the generated various captured images (the face image and the image of the entire body of the subject model and the license plate image) to the communication unit 20.

The communication unit 20 transmits the received synthesized image to the terminal apparatus P1 over the network NW1.

The memory 22 has a RAM (random access memory) as a work memory that is used when, for example, the processor 21 performs each kind of processing and a ROM (read-only memory) that stores the programs that prescribe how the processor 21 should operate and various data. Data or information generated or acquired by the processor 21 is stored in the RAM temporarily. The programs that prescribe how the processor 21 should operate are written in the ROM.

The camera database DB stores information relating to each of plural cameras. The camera database DB outputs information relating to a camera requested by the processor 21. The camera database DB stores, as information relating to each of plural cameras, a product name, a type name, a type number, a resolution, an image compression method, an IPS (images per second) or an FPS (frames per second), an image quality mode, a PPM or a PPF, a bps (bits per second), etc. of the camera. It goes without saying that the information relating to each of plural cameras is not limited to tee above example.

Figure 2A:
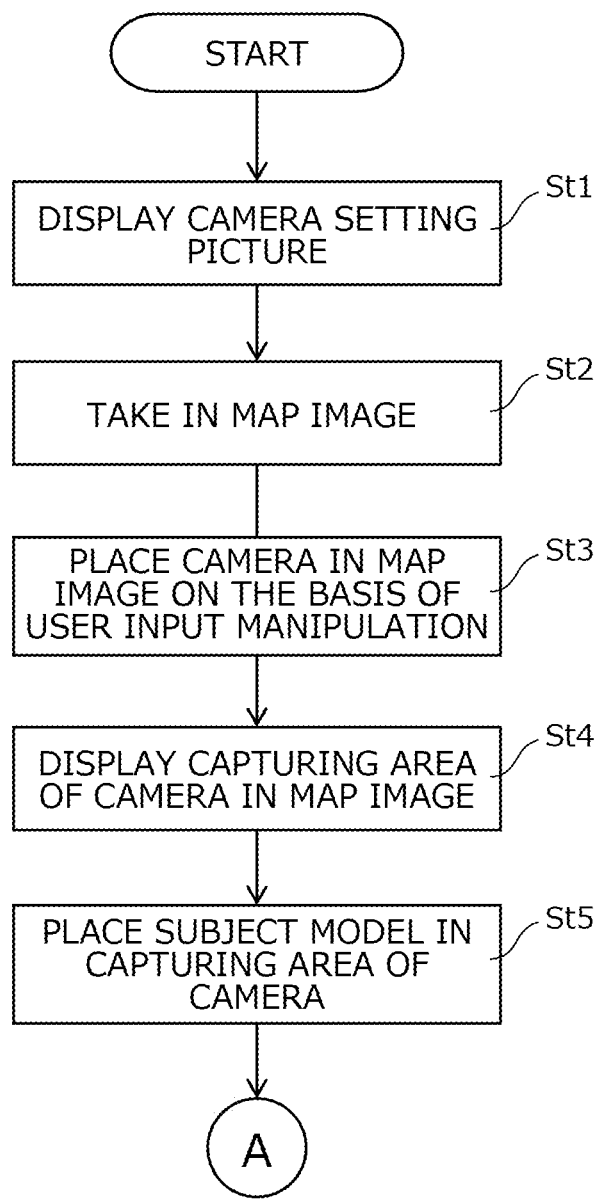
FIGS. 2A and 2B are a flowchart showing an example operation procedure of the camera setting assist system according to the first embodiment.
Figure 2B:
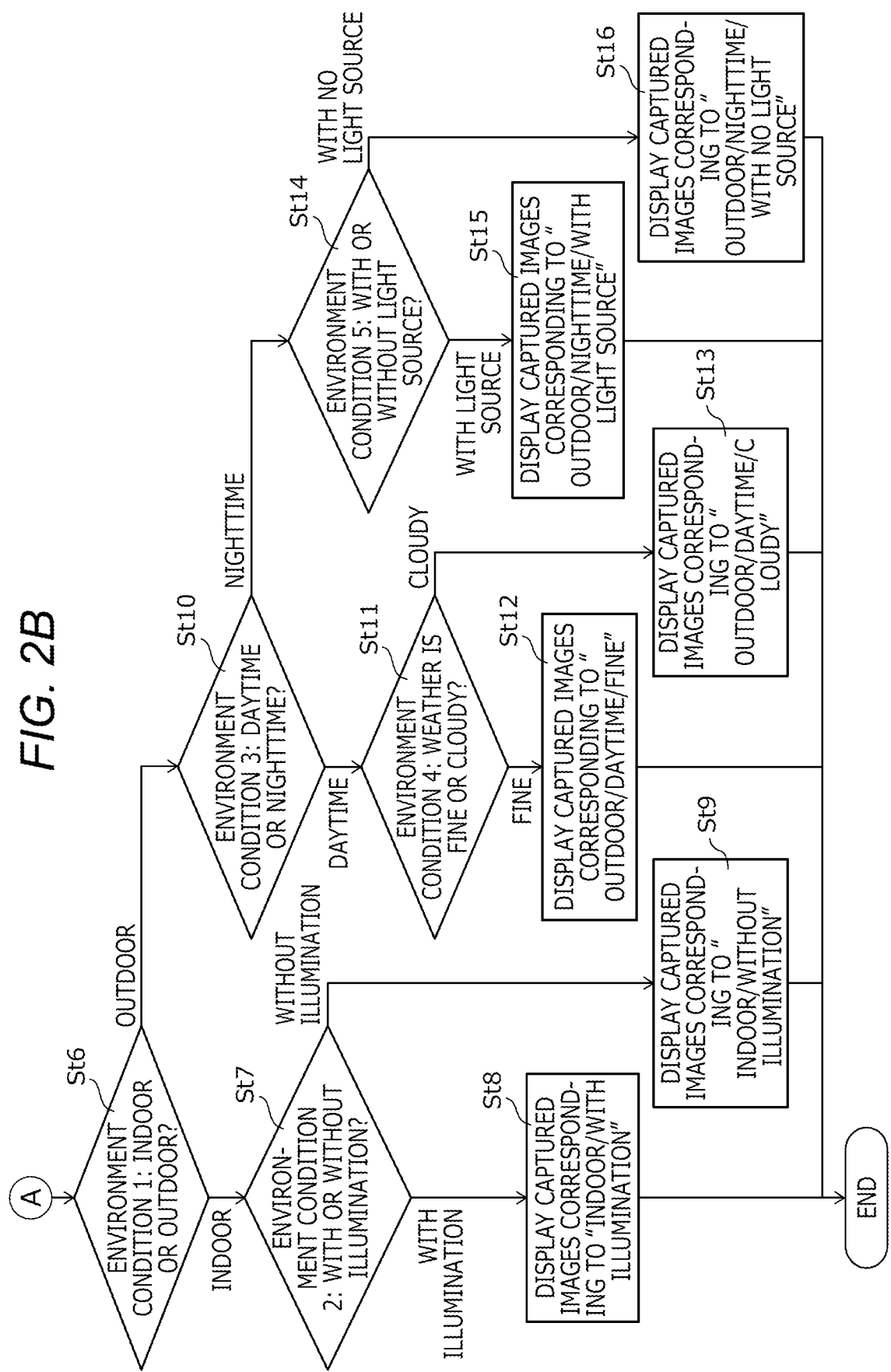

Next, an operation procedure of the camera setting assist system 100 will be described with reference to FIGS. 2A and 2B. FIGS. 2A and 2B are a flowchart showing an example operation procedure of the camera setting assist system 100 according to the first embodiment. The operation procedure shown in FIGS. 2A and 2B is just an example and the order of execution of individual steps is not limited to that shown in FIGS. 2A and 2B.

At step St1, the terminal apparatus P1 displays, on the basis of manipulations of a user, a picture through which to make various settings relating to a camera (more specifically, setting information relating to a camera specified (selected) by the user and environment information indicating an environment in which to install the camera).

At St2, the terminal apparatus P1 takes in a map image IMG that has been uploaded by the user and is to serve as a map or sketch of a room, a parking lot, or the like where to set the camera.

At St3, the server S1 generates, on the basis of an input manipulation of the user, a synthesized image in which an icon indicating the specified (selected) camera is superimposed on the map image IMG at a specified (selected) position. The server S1 transmits the generated synthesized image to the terminal apparatus P1. The synthesized image that is displayed on the terminal apparatus P1 and is to be seen by the user is such that the camera is located at a specified (selected) position in the map image IMG At step St4, the server S1 calculates a capturing area of the camera on the basis of the setting information relating to the camera and the environment information indicating the environment in which to install the camera. And the server S1 generates a new synthesized image by superimposing the calculated capturing area of the camera on the map image IMG of the synthesized image generated at step St3. The server S1 transmits the generated synthesized image to the terminal apparatus P1. The synthesized image displayed on the terminal apparatus P1 and is to be seen by the user includes the camera that is located at the specified (selected) position in the map image IMG and the capturing area of the camera.

At step St5, the server S1 places a subject model in the capturing area (i.e., angle of view) of the camera calculated at step St4. The subject model may be placed at a position specified (selected) by a user input manipulation if it is made. Furthermore, the server S1 generates a synthesized image in which the subject model is superimposed and transmits the generated synthesized image to the terminal apparatus P1. The synthesized image is received by the terminal apparatus P1 and displayed on the monitor 14.

Next, a description will be made of a procedure for generating and displaying various images captured by the camera (a face image and an image of the entire body of the subject model and a license plate image) on the basis of the position of the subject model determined at step St5 and the camera environment conditions that have been set.

At step St6, the server S1 judges which item (indoor or outdoor) of environment condition 1 an environment that has been set by the user satisfies. More specifically, the server S1 judges whether the environment that has been set by the user satisfies a condition indoor or outdoor.

If the environment is indoor (St6: indoor), at step St7 the server S1 judges whether the environment has illumination or not (environment condition 2). Alternatively, where an illuminance value is set to describe environment condition 2, the server S1 may judge whether the illuminance is higher than or equal to the set illuminance value.

The server S1 judges which item (illumination or not) of environment condition 2 the environment that has been set by the user satisfies. More specifically, if the environment has illumination (St7: with illumination), at step St8 the server S1 generates various captured images (a face image and an image of the entire body of the subject model and a license plate image) corresponding to "indoor/with illumination." The server S1 transmits the generated various captured images to the terminal apparatus P1 over the network NW1. The terminal apparatus P1 displays the received various captured images corresponding to "indoor/with illumination" on the monitor 14.

On the other hand, if the environment does not have illumination (St7: without illumination), at step St9 the server S1 generates various captured images (a face image and an image of the entire body of the subject model and a license plate image) corresponding to "indoor/without illumination." The server S1 transmits the generated various captured images to the terminal apparatus P1 over the network NW1. The terminal apparatus P1 displays the received various captured images corresponding to "indoor/without illumination" on the monitor 14.

At step St10, the server S1 judges which item (daytime or nighttime) of environment condition 3 the environment that has been set by the user satisfies. More specifically, if the environment was judged outdoor at step St6, at step St10 the server S1 judges whether the environment condition (time slot) captured by a camera is in the daytime on the nighttime.

The server S1 judges which item (fine or cloudy) of environment condition 4 the environment that has been set by the user satisfies. If the environment is in the daytime (St10: daytime), at step St11 the server S1 judges whether the weather of the environment is fine or cloudy. "Rainy" may be included in "cloudy."

If the weather is fine (St11: fine), at step St12 the server S1 generates various captured images (a face image and an image of the entire body of the subject model and a license plate image) corresponding to "outdoor/daytime/fine." The server S1 transmits the generated various captured images to the terminal apparatus P1 over the network NW1. The terminal apparatus P1 displays the received various captured images corresponding to "outdoor/daytime/fine" on the monitor 14.

On the other hand, if the weather is cloudy (St11: cloudy), at step St13 the server S1 generates various captured images (a face image and an image of the entire body of the subject model and a license plate image) corresponding to "outdoor/daytime/cloudy." The server S1 transmits the generated various captured images to the terminal apparatus P1 over the network NW1. The terminal apparatus P1 displays the received various captured images corresponding to "outdoor/daytime/cloudy" on the monitor 14.

At step S14, the server S1 judges which item (presence or absence of a light source) of environment condition 5 the environment that has been set by the user satisfies. More specifically, if the environment is in the nighttime (Step St10: nighttime), the server S1 judges whether the environment has a light source. Whether the environment has a light source may be judged by judging whether illuminance is obtained. A judgment that the environment has a light source may be made if illuminance is obtained in the case of "outdoor/nighttime." Alternatively, the server S1 may judge whether the illuminance of a set light source is higher than a threshold value.

If judging that a light source exists (St14: with a light source), at step St15 the server S1 generates various captured images (a face image and an image of the entire body of the subject model and a license plate image) corresponding to "outdoor/nighttime/with a light source." The server S1 transmits the generated various captured images to the terminal apparatus P1 over the network NW1. The terminal apparatus P1 displays the received various captured images corresponding to "outdoor/nighttime/with a light source" on the monitor 14.

On the other hand, if judging that a light source does not exist (St14: with no light source), at step St16 the server S1 generates various captured images (a face image and an image of the entire body of the subject model and a license plate image) corresponding to "outdoor/nighttime/with no light source." The server S1 transmits the generated various captured images to the terminal apparatus P1 over the network NW1. The terminal apparatus P1 displays the received various captured images corresponding to "outdoor/nighttime/with no light source" on the monitor 14.

With the above-described operation procedure, the camera setting assist system 100 according to the first embodiment can present various captured images that are suitable for a camera installation environment and realize assistance with a manner of camera installation desired by a user.

Environment conditions 1-5 in the part of the operation procedure shown in FIG. 2B are just examples and the disclosure is not intended to be restricted to them. The camera setting assist system 100 may generate and display various captured images that are suitable for the camera specification in addition to the environment information. The camera specification items are items relating to, for example, illumination provided by a camera. In this case, where the environment is, for example, "outdoor/nighttime," the camera setting assist system 100 may judge, for example, whether the camera provides illumination and whether the illumination provided by the camera is IR illumination and generate various captured images suitable for results of these judgments.

Figure 3A:
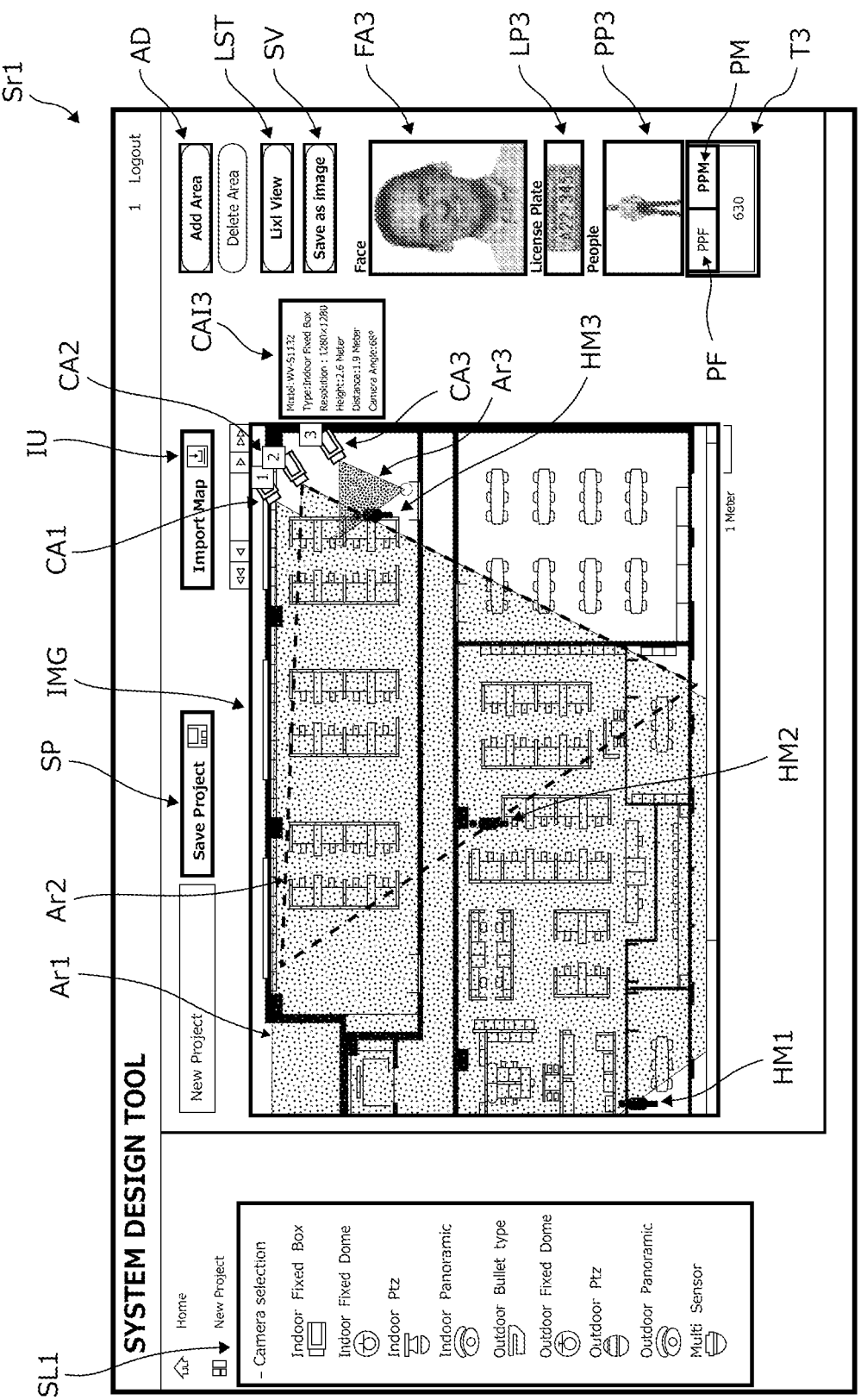
FIG. 3A shows an example display picture of a layout model of a camera (capturing area; small)
Figure 3B:
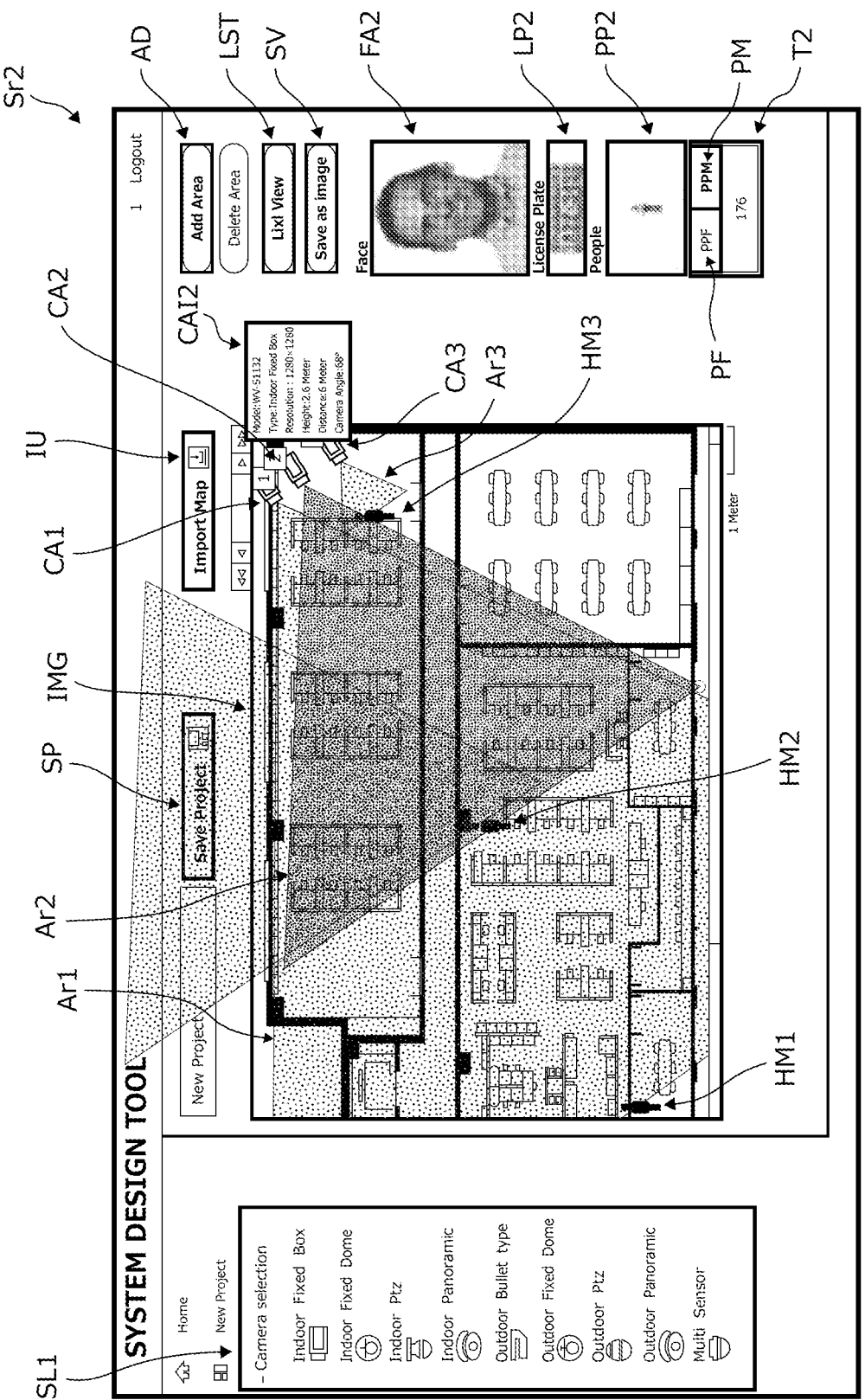
FIG. 3B shows an example display picture of a layout model of the camera (capturing area: medium)
Figure 3C:
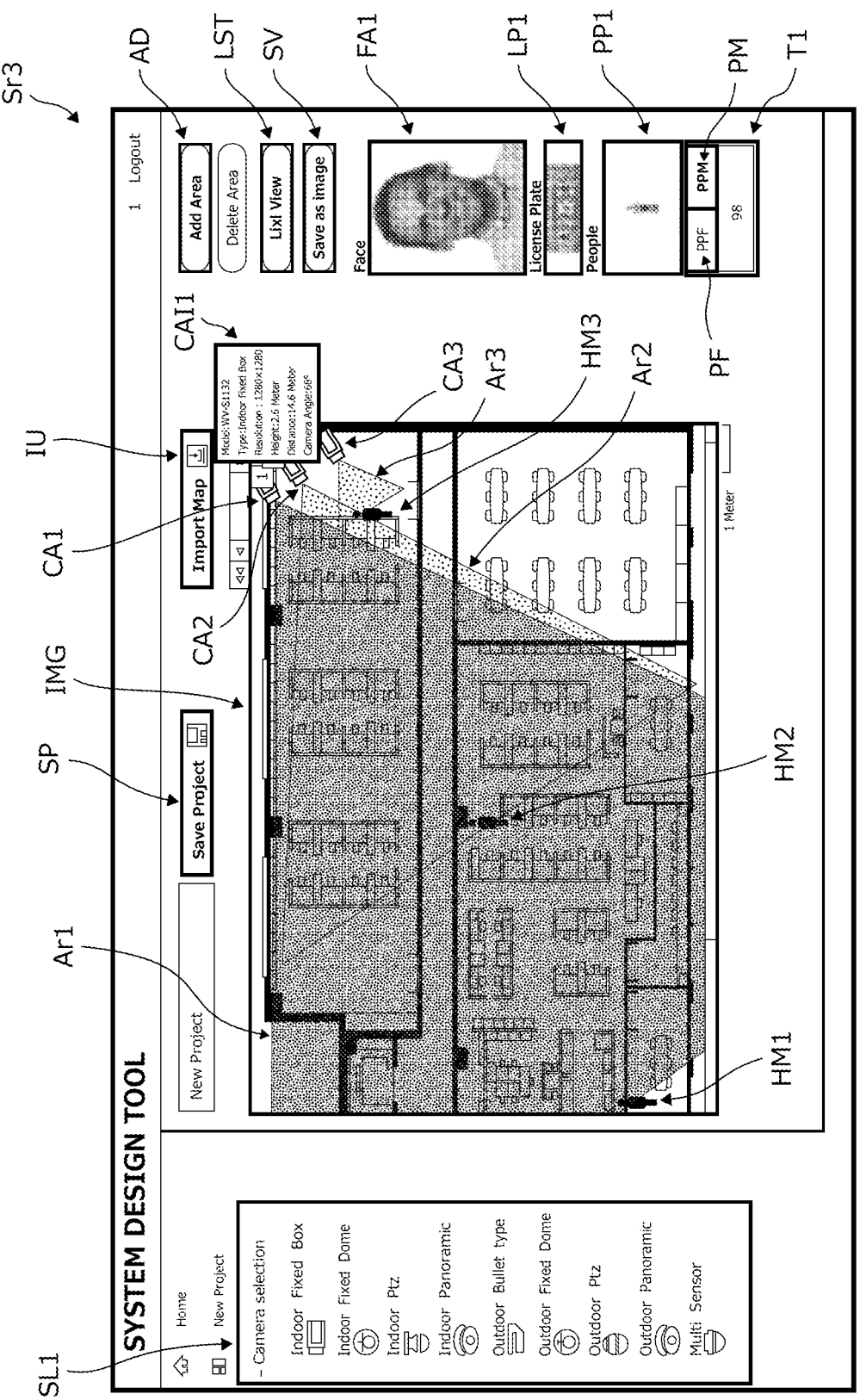
FIG. 3C shows an example display picture of a layout model of the camera (capturing area: large)

Next, example display pictures each of which includes a synthesized image and various captured images and is displayed on the monitor 14 will be described with reference to FIGS. 3A, 3B, and 3C, respectively. FIG. 3A shows an example display picture Sr1 of a layout model of a camera CA3 (capturing area Ar3: small). FIG. 3B shows an example display picture Sr2 of a layout model of a camera CA2 (capturing area Ar2: medium). FIG. 3C shows an example display picture Sr3 of a layout model of a camera CA1 (capturing area Ar1: large). The cameras CA1, CA2, and CA3 shown in FIGS. 3A-3C are the same camera in which the capturing area is expanded or contracted by a user.

The input unit 13 of the camera setting assist system 100 receives a user manipulation for expanding or contracting a capturing area. A manipulation for expanding or contracting the capturing area may be made by either inputting a capturing distance through a setting picture or drag-and-dropping a subject model with the subject model kept selected. When the capturing area has been expanded or contracted by the user, the camera setting assist system 100 generates various captured images suitable for an expansion or contraction-manipulated capturing area and a position of a subject model.

With the above measure, the user can easily see various captured images corresponding to a specified camera and capturing area without the need for inputting details of camera setting information (e.g., PPM). When an environment has been set, the camera setting assist system 100 further generates various captured images that are suitable for the set camera installation environment.

Use-related classifications (e.g., indoor fixed box, indoor fixed dome, indoor PTZ, indoor panoramic, outdoor bullet type, outdoor fixed dome, outdoor PTZ, outdoor panoramic, and multi sensor) of plural cameras stored in the camera database DB are displayed in a camera setting information list SL1. The user selects, from the camera setting information list SL1, a classification of a camera he or she wants to install and inputs such information as setting information of the selected camera and an environment in which to install the camera. No drawing of a setting picture through which to input camera setting information or a camera installation environment is provided.

An upload button IU is a button for uploading a map image IMG of a place to install a camera. The user uploads the map image IMG by pushing the upload button IU.

Each map image IMG is a map or a sketch of a place to install a camera. The camera setting assist system 100 acquires distance information that is stored as part of the data of a map image IMG Where distance information is not stored as part of the data of a map image IMG the user may input distance information of a longer side or a shorter side of the map image in uploading it. One or more cameras CA1-CA3 specified (selected) by the user, capturing areas Ar1, Ar2, and Ar3 that are set for the respective cameras CA1-CA3, and subject models HM1, HM2, and HM3 that would be captured by the respective cameras CA1-CA3 are superimposed on and displayed in the uploaded map image IMG The capturing area Ar1 that is set for the camera CA1 is larger than the capturing areas Ar2 and Ar3 that are set for the other cameras CA2 and CA3 and captures the subject model HM1 that is located at a most distant position in the capturing area Ar1.

The capturing area Ar2 that is set for the camera CA2 is smaller than the capturing area Ar1 and larger than the capturing area Ar3 and captures the subject model HM2 that is located at a most distant position in the capturing area Ar2.

The capturing area Ar3 that is set for the camera CA3 is smaller than the capturing areas Ar1 and Ar2 and captures the subject model HM3 that is located at a most distant position in the capturing area Ar3.

Camera information CAI1 is displayed so as to include part of setting information of the camera CA1 that has been set by the user. For example, the camera information CAI1 shown in FIG. 3C is displayed so as to include setting information of the camera CA1, that is, "model: WV-S1132, type: indoor fixed box, resolution: 1,280×1,280, height: 2.6 m, distance: 14.6 m, and camera angle: 68°." The "height" means an installation height of the camera CA1. The "distance" means a capturing distance (horizontal distance) between the camera CA1 and the subject model. The "camera angle" means an installation angle of the camera CA1.

Camera information CAI2 is displayed so as to include part of setting information of the camera CA2 that has been set by the user. For example, the camera information CAI2 shown in FIG. 3B is displayed so as to include setting information of the camera CA2, that is, "model: WV-S1132, type: indoor fixed box, resolution: 1,280×1,280, height: 2.6 m, distance: 6 m, and camera angle: 68°."

Camera information CAI3 is displayed so as to include part of setting information of the camera CA3 that has been set by the user. For example, the camera information CAI3 shown in FIG. 3A is displayed so as to include setting information of the camera CA3, that is, "model: WV-S1132, type: indoor fixed box, resolution: 1,280×1,280, height: 2.6 m, distance: 1.9 m, and camera angle: 68°."

The pieces of camera information CAI1-CAI3 shown in FIGS. 3A-3C are just examples and the disclosure is not intended to be restricted to them. Each of the pieces of camera information CAI1-CAI3 may include such information as environment items (e.g., "indoor/with illumination" and "outdoor/nighttime/with no light source") and camera pixel density (PPM or PPF).

A save button SP is a button for causing execution of processing of storing various kinds of setting information (camera setting information, environment information, etc.) received by user input manipulations, a map image IMG position information of a camera and a subject model placed (superimposed) in the map image IMG etc. When the save button SP is pushed, the processor 11 stores these kinds of information and images in the memory 12.

A map addition button AD is a button for adding new items such as another floor, room, or section to the current map image IMG The map addition button AD may be such as to be able to cause replacement of the current map image IMG with another map image IMG Next, the various captured images shown in FIG. 3A will be described. In FIG. 3A, the camera CA3 is selected and a face image FA3, a license plate image LP3, and a whole body image PP3 are generated as various captured images for the subject model HM3 that is placed in the capturing area AR3. A pixel density display button PM for displaying a pixel density of the generated various captured images in PPM is selected in FIG. 3A.

When the pixel density display button PM is selected, the camera setting assist system 100 calculates a pixel density T3 by dividing the number of horizontal pixels of the camera by the distance (in meters) to the subject model. The pixel density T3 of the various captured images captured by the camera CA3 shown in FIG. 3A is equal to 630.

With the above measures, the user can judge whether the camera CA3 can capture images required by the user on the basis of the generated various captured images and their pixel density T3. The pixel density T3 "630" of the various captured images captured by the camera CA3 is a pixel density that is suitable for face authentication and enables automatic reading of a number by a reading system.

The various captured images shown in FIG. 3B will be described. In FIG. 3B, the camera CA2 is selected and a face image FA2, a license plate image LP2, and a whole body image PP2 are generated as various captured images for the subject model HM2 that is placed in the capturing area AR2. A pixel density display button PM for displaying a pixel density of the generated various captured images in PPM is selected in FIG. 3B.

When the pixel density display button PM is selected, the camera setting assist system 100 calculates a pixel density T2 by dividing the number of horizontal pixels of the camera by the distance (in meters) to the subject model. The pixel density T2 of the various captured images captured by the camera CA2 shown in FIG. 3B is equal to 176.

With the above measures, the user can judge whether the camera CA2 can capture images required by the user on the basis of the generated various captured images and their pixel density T2. The pixel density T2 "176" of the various captured images captured by the camera CA2 is a pixel density that is not suitable for face authentication but enables visual recognition of the face and the entire body of the subject model HM2 and recognition of an action of the subject model HM2. Furthermore, the pixel density T2 "176" is a pixel density that enables visual reading of the number of the license plate image LP2. In this case, where captured license plates will be checked visually by a manager, a guard, or the like, the user can judge that the pixel density T2 "176" can be used for capturing license plates even with the above settings of the camera CA2.

The various captured images shown in FIG. 3C will be described. In FIG. 3C, the camera CA1 is selected and a face image FA1, a license plate image LP1, and a whole body image PP1 are generated as various captured images for the subject model HM1 that is placed in the capturing area Ar1.

A pixel density display button PM for displaying a pixel density of the generated various captured images in PPM is selected in FIG. 3C.

When the pixel density display button PM is selected, the camera setting assist system 100 calculates a pixel density T1 by dividing the number of horizontal pixels of the camera by the distance (in meters) to the subject model. The pixel density T1 of the various captured images captured by the camera CA1 shown in FIG. 3C is equal to 98.

With the above measures, the user can judge whether the camera CA1 can capture images required by the user on the basis of the generated various captured images and their pixel density T1. The pixel density T1 "98" of the various captured images captured by the camera CA1 is a pixel density that is not suitable for face authentication but enables visual recognition of the entire bod of the subject model HM1 and recognition of an action of the subject model HM1. On the other hand, the pixel density T1 "98" is a pixel density with which it is difficult to read the number of the license plate image LP1 visually.

Although the pixel densities T1-T3 described above with reference to FIGS. 3A-3C are pixel densities of the case that the pixel density display button PM is selected, a pixel density display button PF may be selected. Where the pixel density display button PF is selected, the camera setting assist system 100 calculates a PPF value by dividing the number of horizontal pixels of the camera by a distance (in feet) to the subject model. An example of the case that the pixel density display button PM is selected will be described with reference to FIG. 10.

A camera list button LST is a button for converting the pieces of setting information that have been set for the one or more cameras that are installed in the map image IMG into, for example, pieces of setting information in CSV (comma-separated values) form and downloading the latter pieces of setting information. Using the camera list button LST, the user can download, together, the pieces of setting information that have been set for the one or more respective cameras that are installed in the map image IMG Furthermore, capable of downloading the pieces of setting information of the cameras in CSV form, the user can produce an order slip or the like easily.

An image save button SV is a button for storing, in the memory 12, as image data, a synthesized image obtained by superimposing, on the map image IMG, the respective cameras (located at the respective positions), the capturing areas of the respective cameras, and the subject models (located at the respective positions). When the image save button SV is pushed, the processor 11 stores the synthesized image in the memory 12. The image data to be stored is not limited to the synthesized image; for example, the face images and the whole body images of the subject model and the license plate images or the pixel densities (i.e., PPMs or PPFs) may be stored so as to be correlated with the synthesized image.

Figure 4:
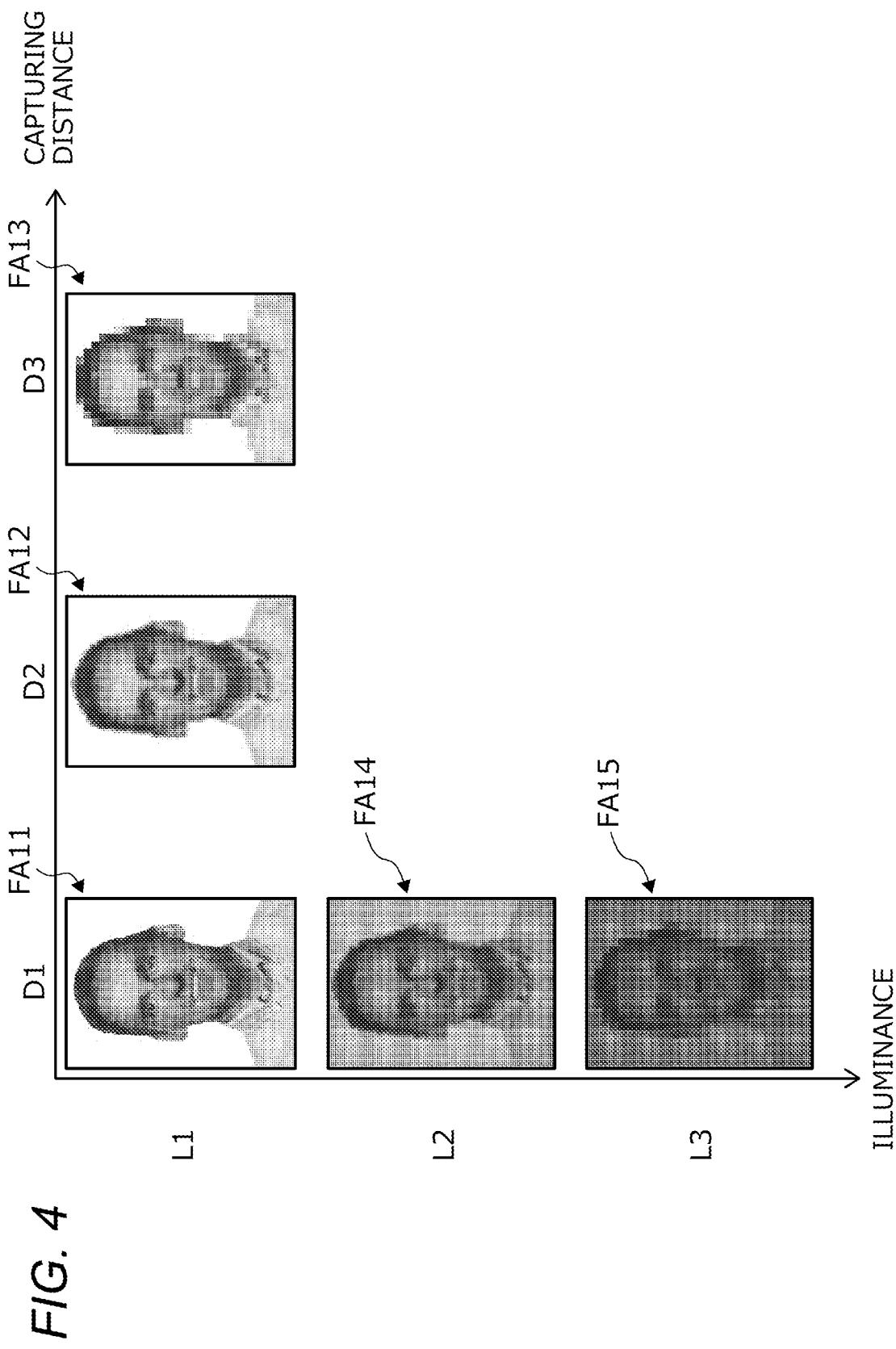
FIG. 4 compares example face images corresponding to respective environments.

FIG. 4 compares example face images FA11, FA12, FA13, FA14, and FA15 corresponding to respective environments. The horizontal axis of FIG. 4 is the capturing distance between the camera and the subject model. A capturing distance D1 is shortest and a capturing distance D3 is longest. The vertical axis of FIG. 4 is the illuminance which is one of the environment items of capturing by a camera. Illuminance L1 is highest and illuminance L3 is lowest.

The face image FA11 is a face image of the subject model that was captured under conditions of the distance D1 and the illuminance L1. The face image FA12 is a face image of the subject model that was captured under conditions of the distance D2 and the illuminance L1. The face image FA13 is a face image of the subject model that was captured under conditions of the distance D3 and the illuminance L1. As seen from these face images FA11-FA13, the pixel density of the face image becomes lower and recognition of the face of the subject model becomes more difficult as the capturing distance increases.

The face image FA11 is a face image of the subject model that was captured under conditions of the distance D1 and the illuminance L1. The face image FA14 is a face image of the subject model that was captured under conditions of the distance D1 and the illuminance L2. The face image FA15 is a face image of the subject model that was captured under conditions of the distance D1 and the illuminance L3. As seen from these face images FA11, FA14, and FA15, the face images itself becomes darker and recognition of the face of the subject model becomes more difficult as the illuminance at the time of capturing decreases.

As described above, the camera setting assist system 100 according to the first embodiment includes the terminal apparatus P1 capable of receiving an input manipulation of a user and the server S1 that are connected to each other so as to communicate with each other. The terminal apparatus P1 transmits, to the server S1, setting information including specification information of a camera CAL environment information indicating an environment in which to install the camera CAL and a map image IMG of a place where to install the camera CA1 that are input by input manipulations of the user. The server S1 calculates a capturing area Ar1 of the camera CA1 in the map image IMG on the basis of the received setting information and environment information, places a subject model HM1 to serve as a capturing target of the camera CA1 at a prescribed position in the calculated capturing area Ar1, generates a synthesized image by superimposing the capturing area Ar1 and the subject model HM1 on the map image IMG generates a face image FA1 and a whole body image PP1 of the subject model HM1 located at the prescribed position that are inferred to be captured by the camera CA1 on the basis of the setting information and the environment information; and transmits the generated synthesized image and the generated face image FA1 and whole body image PP1 of the subject model HM1 to the terminal apparatus P1. The terminal apparatus P1 displays the received synthesized image and the received face image FA1 and whole body image PP1 of the subject model HM1.

Configured as described above, the camera setting assist system 100 according to the first embodiment generates and displays, as a captured image suitable for the installation environment of the camera CAL a face image FA1 and a whole body image PP1 of a person located at the position of the subject model HM1 and can thereby assist the user in checking a specification relating to the image quality of an image captured by the camera CA1. That is, the user can check captured images (face image FA1 and whole body image PP1) generated according to the installation environment of the camera CA1 and can check whether these captured images satisfy the specification required by the user.

In the camera setting assist system 100 according to the first embodiment, the server S1 further generates a license plate image LP1 of a vehicle that is inferred to be captured by the camera CA1 if the vehicle were placed at the prescribed position on the basis of the setting information and the environment information, and transmits the generated license plate image LP1 to the terminal apparatus P1. The terminal apparatus P1 displays the received license plate image LP1. With this measure, the camera setting assist system 100 according to the first embodiment generates and displays, as a captured image suitable for the installation environment of the camera CA1, a license plate image LP1 of a vehicle located at the position of the subject model HM1 and can thereby support the user in checking specification items relating to the image quality of an image (license plate image LP1) captured by the camera CA1. That is, the user can check a captured image (license plate image LP1) generated according to the installation environment of the camera CA1 and can check whether this captured image satisfies a specification required by the user.

In the camera setting assist system 100 according to the first embodiment, the server S1 generates a face image, a whole body image, and a license plate image that are inferred to be captured by a camera that is selected by a manipulation performed on the terminal apparatus P1 by the user and transmits them to the terminal apparatus P1. The terminal apparatus P1 displays the received face image, whole body image, and license plate image. With this measure, the camera setting assist system 100 according to the first embodiment generates and displays, as captured images suitable for the installation environment of the camera, a face image and a whole body image of a person located at the position of the subject model HM1 and a license plate image of a vehicle located at the position of the subject model HM1 and can thereby support the user in checking specification items relating to the image quality of images captured by the camera. That is, the user can check a face image, a whole body image, and a license plate image generated according to the installation environment of the camera and can check whether these captured images satisfy a specification required by the user.

In the camera setting assist system 100 according to the first embodiment, the server S1 generates a synthesized image in which a color of a capturing area of a camera selected by a manipulation performed on the terminal apparatus P1 by the user among one or more cameras is changed. With this measure, the camera setting assist system 100 according to the first embodiment can show a camera currently selected by the user and allows the user to check a capturing area of the selected camera.

In the camera setting assist system 100 according to the first embodiment, the server S1 superimposes an icon indicating a position of the camera CA1 on the map image IMG With this measure, the camera setting assist system 100 according to the first embodiment allows the user to check a position of a camera installed by himself or herself.

Modification 1 of Embodiment 1

A first modification of the first embodiment is directed to a camera setting assist system 100A which is different from the camera setting assist system 100 according to the first embodiment in that setting information corresponding to a use of a camera is set in advance. The camera setting assist system 100A according to the first modification of the first embodiment allows a user to designate (select) setting information corresponding to a use of a camera. The configuration of the camera setting assist system 100A according to the first modification of the first embodiment is approximately the same as that of the camera setting assist system 100 according to the first embodiment, and hence constituent elements having the same ones in the camera setting assist system 100 according to the first embodiment will be given the same reference symbols as the latter and will be described in a simplified manner or will not be described at all; only differences will be described.

A camera database DB employed in the first modification of the first embodiment is stored with pieces of setting information of a camera corresponding to respective uses of the camera. The pieces of setting information corresponding to respective uses may be pieces of setting information corresponding to specifications of respective cameras.

Examples of the term "use" as used herein are face authentication in the daytime, face authentication in the nighttime, outdoor behavioral authentication in the nighttime, license plate authentication by image analysis, and license plate authentication by visual recognition. The uses may be roughly classified ones such as face recognition, whole body behavioral authentication, license plate authentication, etc. rather than finely classified ones.

Where, for example, the use of a camera is face authentication, setting information corresponding to the use is N pixel density (PPM or PPF) levels (N: integer) for face recognition, illuminance levels, or the like.

In the first modification of the first embodiment, the input unit 13 generates signals on the basis of user manipulations relating to designation (selection) of a camera and a use of the designated (selected) camera and outputs the generated signal to the processor 11. Then the signals are input in the processer 11, transmitted from the communication unit 10 of the terminal apparatus P1 to the communication unit 20 of the server S1 and output to the processor 21. Based on the received signals, the processor 21 requests the camera database DB to retrieve information relating to the designated (selected) camera and camera setting information corresponding to the use.

User input manipulations relating to camera setting information of a camera may be displayed with priority given to ones relating to uses of the camera. In this case, the camera setting assist system 100 can eliminate cameras that do not satisfy a specification that is required for a use of a camera. This allows the camera setting assist system 100 to present, to the user, cameras that satisfy a specification that is required for a use of a camera. That is, the user can check whether images captured by a camera satisfy a specification required by the user.

Figure 5:
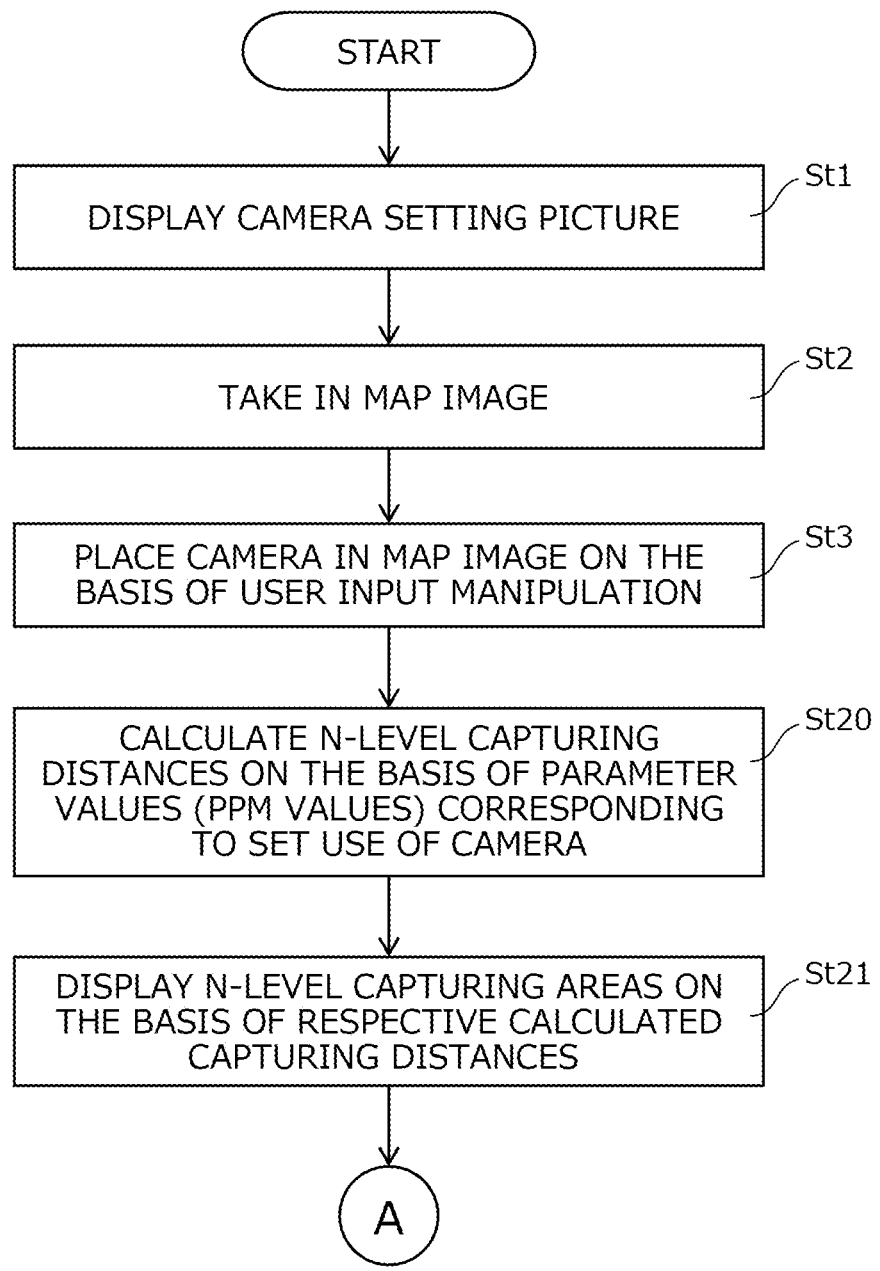
FIG. 5 is a flowchart showing an example procedure for calculating a capturing area corresponding to a use that is set in a camera setting assist system according to a first modification of the first embodiment.

FIG. 5 is a flowchart showing an example procedure for calculating a capturing area corresponding to a use that is set in the camera setting assist system 100A according to the first modification of the first embodiment. In the example procedure for calculating a capturing area in camera setting assist system 100A according to the first modification of the first embodiment, steps having the same ones in the camera setting assist system 100 according to the first embodiment will be described in a simplified manner or will not be described at all; only differences will be described.

At step St1 of the procedure employed in the camera setting assist system 100A according to the first modification of the first embodiment, a user inputs a setting, relating to a use of a camera CA4, of setting information of the camera CA4 shown in a displayed setting information of the camera CA4. Among the steps of the calculation procedure shown in FIG. 5, steps St1-St3 are the same as those of the operation procedure employed in the first embodiment and hence will not be described further.

When a use of the camera CA4 is set by the user, at step St20 the server S1 refers to parameter values (e.g., N PPM or PPF levels) that are set in advance for the use. The server S1 calculates N-level capturing distances on the basis of the respective parameter values referred to.

At step St21, the server S1 calculates N-level capturing areas DN1, DN2, and DN3 on the basis of the respective calculated N-level capturing distances and the camera setting information or environment information. The server S1 generates each of the calculated N-level capturing areas DN1-DN3 in the form of a circular area centered at the camera CA4 and generates a synthesized image by superimposing the generated N-level capturing areas DN1-DN3 on a map image IMG The server S1 transmits the generated synthesized image to the terminal apparatus P1. The synthesized image to be seen by the user is displayed in the terminal apparatus P1 so as to include the camera CA4 (displayed at a specified (selected) position in the map image IMG) and its capturing areas DN1-DN3.

Figure 6:
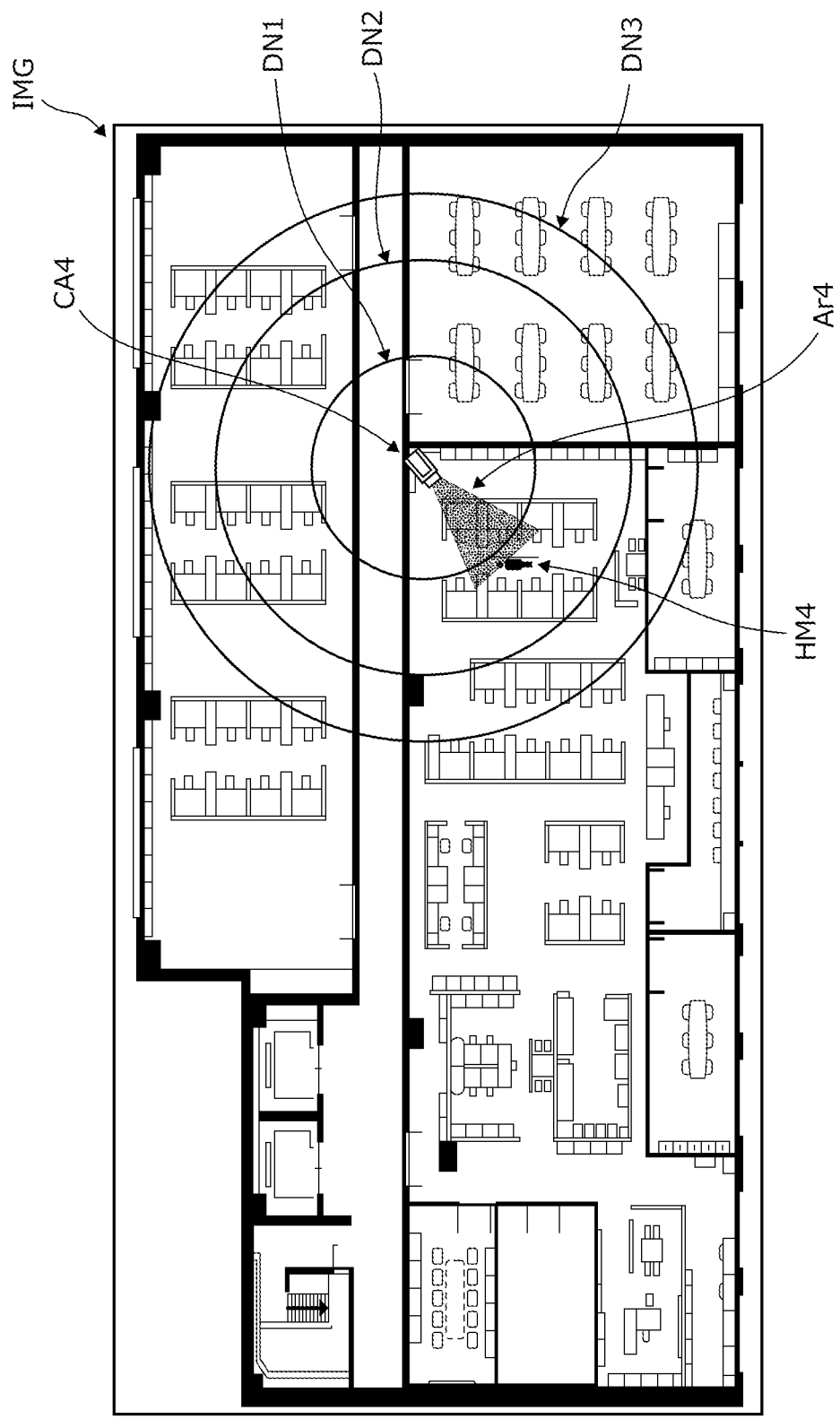
FIG. 6 shows an example display of capturing areas corresponding to a use setting of a camera.

The calculated and displayed capturing areas may assume either fan shapes as shown in FIGS. 3A-3C (first embodiment) or circular shapes centered by the camera CA4 as shown in FIG. 6 (first modification of first embodiment). Furthermore, as shown in FIG. 6, a fan-shaped capturing area Ar4 that reflects an installation angle of the camera CA4 and circular capturing areas DN1, DN2, and DN3 may both be displayed so as to be superimposed on the map image IMG Then the camera setting assist system 100A moves to the operation process shown in FIG. 2B and generates various captured images that are suitable for an environment set by the user.

As described above, the camera setting assist system 100A according to the first modification of the first embodiment can calculate a capturing distance and a capturing area of a camera on the basis of a use setting of the camera and present a captured image that is suitable for a set environment of the camera. Furthermore, since a use of a camera can be set, a manner of installation of a camera can be simulated easily, that is, without the need for setting camera setting information finely, and various captured images can be acquired as a result of the simulation.

FIG. 6 shows an example display of capturing areas DN1-DN3 corresponding to a use setting of the camera CA4. A description will be made of a case that a user has set face authentication as a use of the camera CA4 shown in FIG. 6.

The camera CA4, the capturing area Ar4, the plural capturing areas DN1-DN3, and a subject model HM4 are superimposed on the map image IMG shown in FIG. 6.

When face authentication is set as a use by a user, the processor 21 refers to the camera database DB and sets three PPM levels 240, 300, and 630 as parameter values that allow the camera CA4 to capture a face image suitable for face authentication. These parameter values are just examples and it goes without saying that the disclosure is not intended to be restricted to them.

The capturing area Ar4 of the camera CA4 is a capturing area that has been calculated according to the operation procedure employed in the first embodiment. The subject model HM4 is generated and placed in the capturing area Ar4 according to the operation procedure employed in the first embodiment. The capturing area Ar4 and the subject model HM4 are not indispensable and may be omitted in the first modification of the first embodiment.

The plural capturing areas DN1-DN3 are calculated by the processor 21 on the basis of the three PPM levels 240, 300, and 630 that have been set as parameter values. The capturing areas DN1-DN3 are capturing areas corresponding to the PPM values 630, 300, 240, respectively.

The plural capturing areas DN1-DN3 are superimposed on the map image IMG in the form of concentric circles centered at the camera CA4. In this manner, the camera setting assist system 100A can visualize capturing areas where the camera CA4 designated (selected) by the user can capture an image that is suitable for the set use (face authentication).

Although not shown in FIG. 6, a subject model may be placed in each of the plural capturing areas DN1-DN3. Furthermore, the camera setting assist system 100A may be configured in such a manner that the positions of each capturing area and each subject model can be changed.

Where the use is set to face authentication, face images of plural subject models located in the plural capturing areas DN1-DN3 may be displayed at the same time. In this case, the user can easily compare the face images that would be captured in the N capturing areas corresponding to parameter values of the set use. It goes without saying that the captured images of subject models located in different capturing areas are not limited to face images and may be whole body images or license plate images.

As described above, in the camera setting assist system 100A according to the first modification of the first embodiment, the server S1 acquires values of a setting parameter that are set stepwise for each use of the camera on the basis of use information of the camera that is included in the received setting information and calculates capturing areas DN1-DN3 corresponding to the respective values of the setting parameter. With this measure, in the camera setting assist system 100A according to the first modification of the first embodiment, capturing areas can be calculated on the basis of camera setting information corresponding to a use. That is, a user can check capturing areas corresponding to respective setting parameter values for a selected use and a selected camera without the need for making complicated camera settings.

The setting parameter used in the camera setting assist system 100A according to the first modification of the first embodiment is a pixel density of the camera. With this measure, the camera setting assist system 100A according to the first modification of the first embodiment can calculate capturing areas corresponding to respective pixel densities of the camera that are suitable for a use.

The setting parameter used in the camera setting assist system 100A according to the first modification of the first embodiment is illuminance that is an item of the environment information. With this measure, the camera setting assist system 100A according to the first modification of the first embodiment can calculate capturing areas corresponding to respective pixel densities of a camera that are suitable for a use that is an item of the environment in which to install the camera.

Modification 2 of Embodiment 1

A second modification of the first embodiment is directed to a camera setting assist system 100B capable of downloading camera setting information as employed in the first embodiment. The configuration of the camera setting assist system 100B according to the second modification of the first embodiment is approximately the same as that of the camera setting assist system 100 according to the first embodiment and the camera setting assist system 100A according to the first modification of the first embodiment, and hence constituent elements having the same ones in the camera setting assist systems 100 and 100A will be given the same reference symbols as the latter and will be described in a simplified manner or will not be described at all; only differences will be described.

Figure 7:
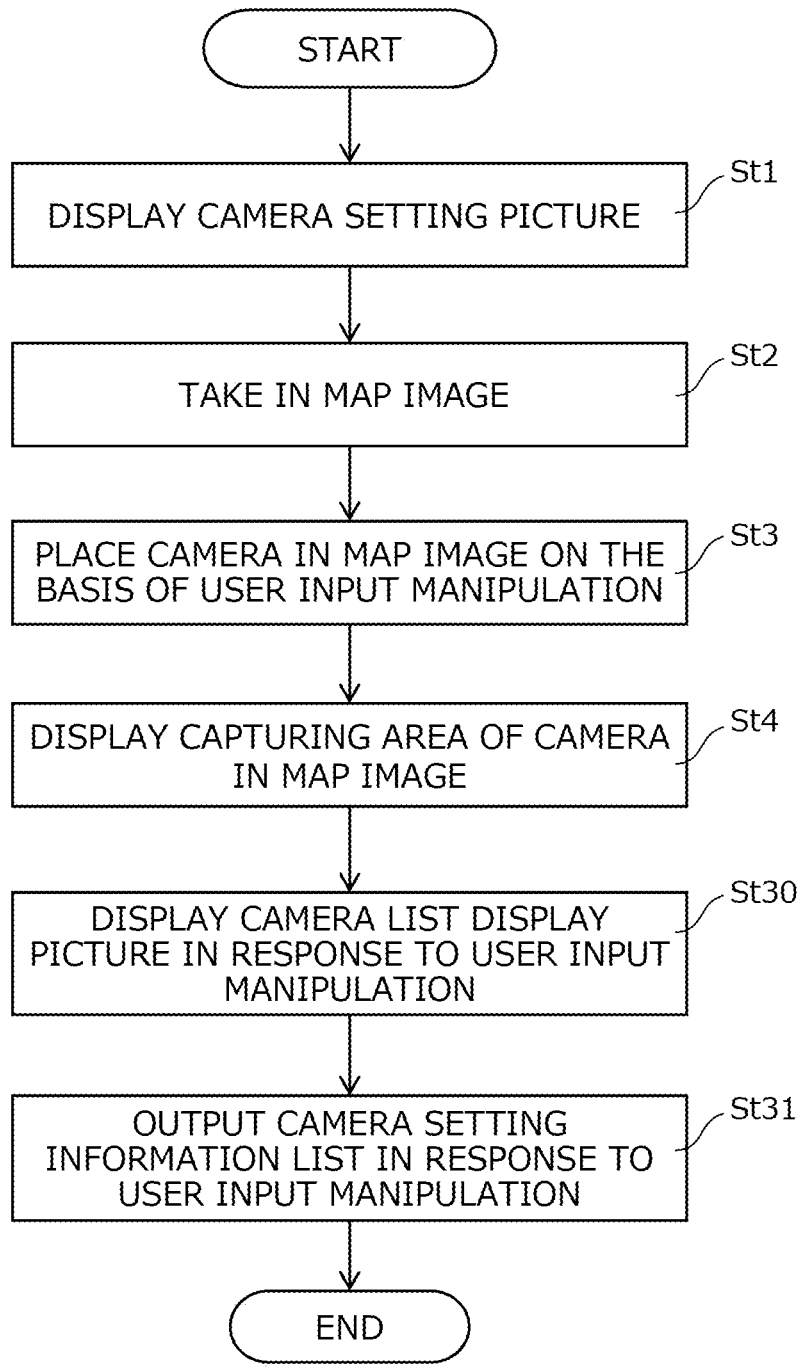
FIG. 7 is a flowchart showing an example procedure for outputting a camera setting information list in a camera setting assist system according to a second modification of the first embodiment.

FIG. 7 is a flowchart showing an example procedure for outputting a camera setting information list LST1 in the camera setting assist system 100B according to the second modification of the first embodiment. Steps, having the same ones in the example operation procedure of the camera setting assist system 100 according to the first embodiment, of the example procedure for outputting a camera setting information list LST1 in the camera setting assist system 100B according to the second modification of the first embodiment (see FIG. 7) will be described in a simplified manner or will not be described at all; only differences will be described. Steps St1-St4 of the example output procedure shown in FIG. 7 will not be described below because they have the same steps in the example operation procedure of the camera setting assist system 100 according to the first embodiment.

When a camera list button LST is pushed by a user (input manipulation), at step St30 the server S1 generates a camera list display picture that is a list of pieces of setting information of respective cameras that were set by the user. The generated camera list display picture is displayed on the monitor 14.

More specifically, when the camera list button LST is pushed by the user, the processor 21 generates a camera list display picture on the basis of pieces of setting information of respective cameras that were set by the user. The generated camera list display picture is transmitted to the communication unit 10 of the terminal apparatus P1 via the communication unit 20 of the server S1 and output to the processor 11. The processor 11 displays the received camera list display picture on the monitor 14.

When an output button (not shown) is then pushed by the user (input manipulation), at step St31 the server S1 outputs the camera setting information list LST1 (see FIG. 8) being displayed as a result of the execution of step St30 in such a manner that it can be downloaded in CSV form.

Then the camera setting assist system 100 moves to the operation process shown in FIG. 2B and generates various captured images that are suitable for an environment set by the user.

As described above, in the camera setting assist system 100B according to the second modification of the first embodiment, when the output button (not shown) for outputting a camera list in a displayed camera list display picture is pushed by a user, the processor 11 converts a camera setting information list LST1 including specifications and pieces of setting information of respective cameras into CSV form and outputs the converted camera setting information list LST1. The camera setting information list LST1 is downloaded by the user and will be used for a purpose of, for example, producing an order slip of each camera.

FIG. 8 is a table showing an example manner of display of the camera setting information list LST1. The camera setting information list LST1 shown in FIG. 8 is just an example and it goes without saying that the disclosure is not intended to be restricted to it.

The camera setting information list LST1 shown in FIG. 8 is formed so as to include a specification and setting information of each camera and includes items "No.," "model," "title," "resolution," "compression," "rate," "quality," "PPM," and "bps."

The item "No." is an identification number that is assigned to each camera designated (selected) by a user. For example, as shown in FIG. 8, numbers "1," "2," "3," "4," and "5" are assigned as the item "No." The item "No." is assigned by the processor 21 and can be changed on the basis of a user input manipulation.

The item "model" means a camera type, a type number, or the like. For example, as shown in FIG. 8, "WV-S1131," "WV-X4171," "WV-X4171," "WV-S6130," and "WV-S2550" are assigned as the item "model."

The item "title" is a name of a camera that is displayed in (superimposed on) a map image IMG For example, as shown in FIG. 8, "Camera1," "Camera2," "Camera3," "Camera4," and "Camera5" are assigned as the item "title." The item "title" can be changed on the basis of a user input manipulation. The item "title" is a name that is assigned by the processor 21 and makes a camera displayed in (superimposed on) a map image IMG recognizable.

The item "resolution" means a resolution of a camera. For example, as shown in FIG. 8, camera resolutions "1,280×960" and "1,280×1,280" are assigned as the item "resolution."

The item "compression" means a moving image compression standard used for a video captured by a camera. For example, as shown in FIG. 8, a camera moving image compression standard "H.265" is assigned as the item "compression."

The item "rate" means the number of images captured by a camera per second (ips: images per second). For example, as shown in FIG. 8, the number of images "10 ips" is assigned as the item "rate." The item "rate" may be assigned in the form of a frame rate (FPS: frames per second).

The item "quality" means an image quality mode of a camera. For example, as shown in FIG. 8, an image quality mode "FQ (fine quality)" is assigned as the item "quality."

The item "PPM" means a pixel density of a camera. For example, as shown in FIG. 8, camera pixel densities "160," "163," "262," and "321" are assigned as the item "PPM."

The item "bps" means a data transmission rate (i.e., the number of data bits transmitted per second) of a camera. For example, as shown in FIG. 8, camera data transmission rates "640" and "768" are assigned as the item "bps."

As described above, in the camera setting assist system 100B according to the second modification of the first embodiment, the server S1 converts the received setting information of the camera into setting information in CSV form and transmits the converted setting information to the terminal apparatus P1. The terminal apparatus P1 outputs the converted setting information of the camera. With this measure, a user can acquire, in CSV form, pieces of setting information of cameras he or she set and use each of them to produce a document such as an order slip.

Modification 3 of Embodiment 1

A third modification of the first embodiment is directed to a camera setting assist system 100C which corrects a camera installation direction employed in the first embodiment to such a direction that the camera can capture in an area in a map image IMG The configuration of the camera setting assist system 100C according to the third modification of the first embodiment is approximately the same as that of the camera setting assist system 100 according to the first embodiment, and the camera setting assist system 100A according to the first modification of the first embodiment, and the camera setting assist system 100B according to the second modification of the first embodiment and hence constituent elements having the same ones in the camera setting assist systems 100, 100A, and 100B will be given the same reference symbols as the latter and will be described in a simplified manner or will not be described at all; only differences will be described.

Figure 9:
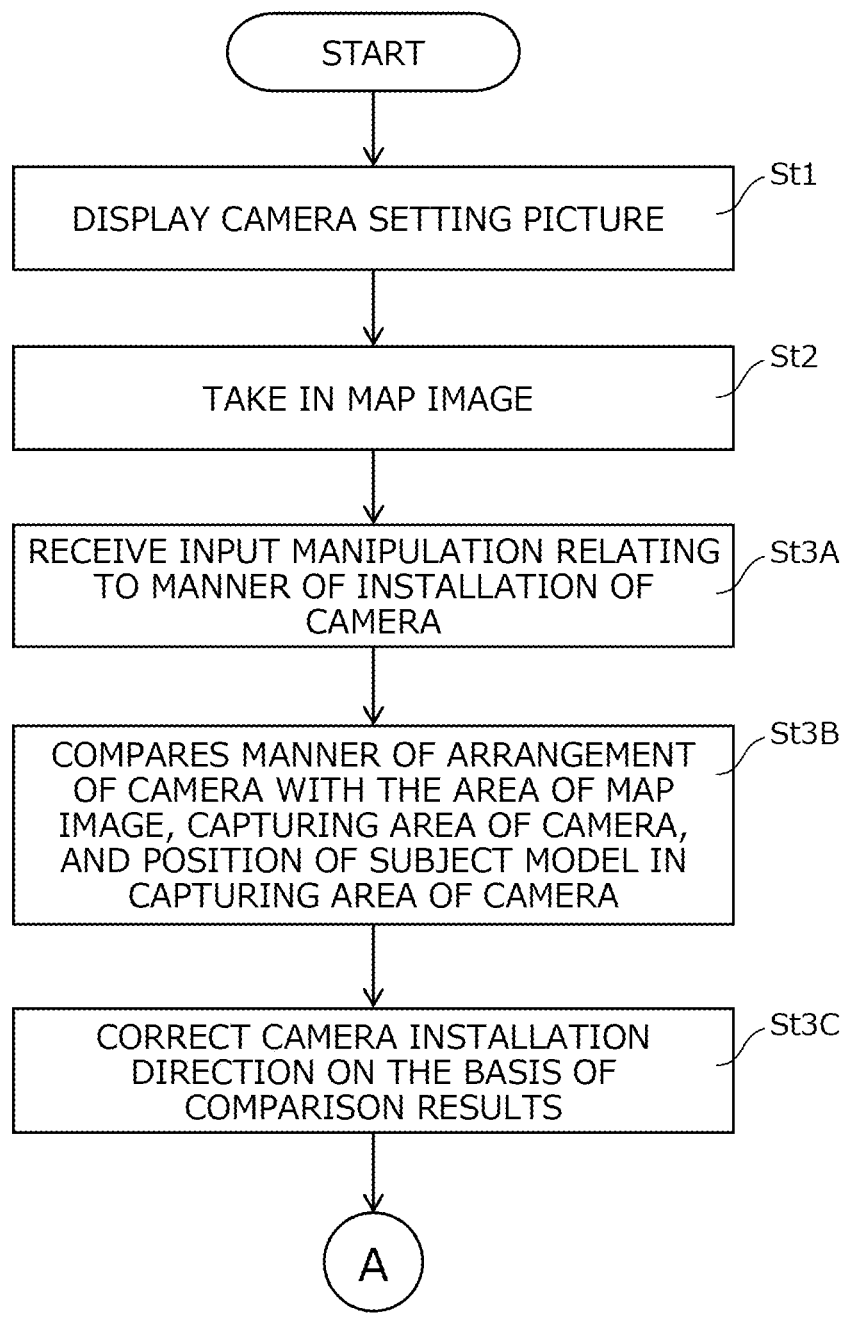
FIG. 9 is a flowchart showing an example procedure for correcting a camera installation direction in a camera setting assist system according to a third modification of the first embodiment.

FIG. 9 is a flowchart showing an example procedure for correcting a camera installation direction in the camera setting assist system 100C according to the third modification of the first embodiment. Steps, having the same ones in the example operation procedure of the camera setting assist system 100 according to the first embodiment, of the example procedure for correcting a camera installation direction in the camera setting assist system 100C according to the third modification of the first embodiment (see FIG. 9) will be described in a simplified manner or will not be described at all; only differences will be described. Steps SU and St2 of the of the example camera installation direction correction procedure shown in FIG. 9 will not be described below because they have the same steps in the example operation procedure of the camera setting assist system 100 according to the first embodiment.

At step St3A, the terminal apparatus P1 receives a user input manipulation relating to a manner of installation of a camera (more specifically, a position and a direction of installation of a camera). The terminal apparatus P1 generates a signal corresponding to the user input manipulation and transmits the generated signal to the server S1.

At step St3B, the server S1 compares the manner of arrangement indicated by the received signal with the area of a map image IMG a capturing area of the camera, and a position of a subject model in the capturing area of the camera.

At step St3C, the server S1 corrects the camera installation direction if it is found as a result of the execution of step St3B that the capturing area of the camera in the arrangement indicated by the received signal and the subject model in the capturing area are located outside the map image IMG More specifically, the server S1 corrects the camera installation direction so that the capturing area of the camera and the subject model in the capturing area are located in the map image IMG More specifically, if the camera is placed at a top-left position in the map image IMG the server S1 corrects the camera installation direction (i.e., the direction of the capturing area) so as to be directed to a bottom-right position. If the camera is placed at a bottom-left position in the map image IMG the server S1 corrects the camera installation direction (i.e., the direction of the capturing area) so as to be directed to a top-right position. If the camera is placed at a top-right position in the map image IMG the server S1 corrects the camera installation direction (i.e., the direction of the capturing area) so as to be directed to a bottom-left position. If the camera is placed at a bottom-right position in the map image IMG the server S1 corrects the camera installation direction (i.e., the direction of the capturing area) so as to be directed to a top-left position.

The server S1 generates a synthesized image by superimposing the camera whose installation direction has been corrected by step St3C, the capturing area of the camera, and the subject model on the map image IMG and transmits the generated synthesized image to the terminal apparatus P1.

Then the camera setting assist system 100C moves to the operation process shown in FIG. 2B and generates various captured images that are suitable for an environment set by the user.

Figure 10:
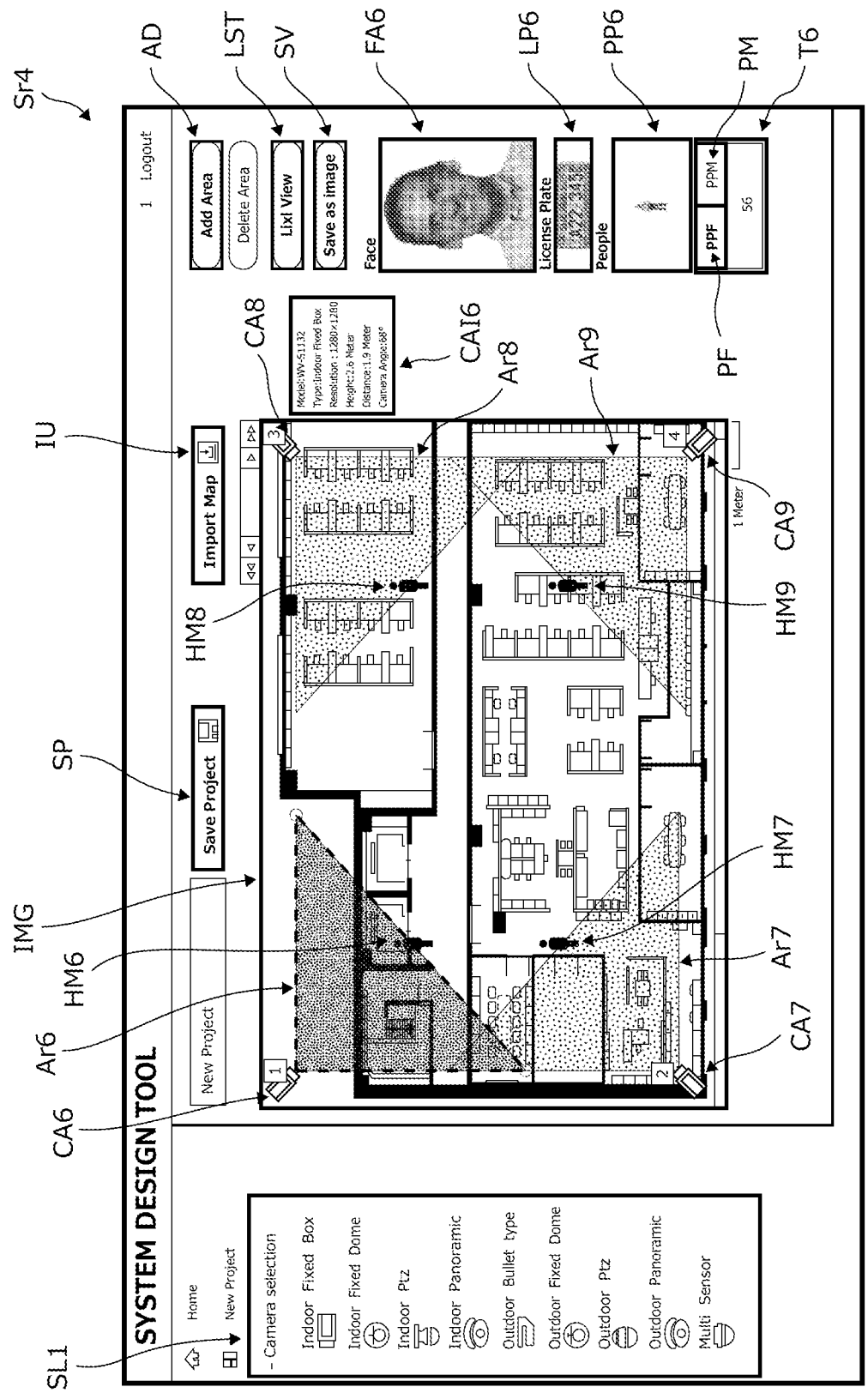
FIG. 10 shows an example of how a camera installation direction is corrected.

As described above, the camera setting assist system 100C according to the third modification of the first embodiment can correct a camera installation direction so that the camera does not capture an area outside the map image IMG FIG. 10 shows an example of how a camera installation direction is corrected. In a picture Sr4 shown in FIG. 10, items having the corresponding ones in FIGS. 3A-3C are given the same reference symbols as the latter and will not be described.

Various captured images (i.e., face image FA6, whole body image PP6, and license plate image LP6) shown in FIG. 10 are simulated captured images that are inferred to be captured by a camera CA6. A pixel density T6 is calculated in PPF and is a pixel density of each of the various captured images captured by the camera CA6.

Capturing areas, for which installation directions have been corrected, of four cameras CA6, CA7, CA8, and CA9 are superimposed on a map image IMG For example, in the camera setting assist system 100C, the corrected capturing areas are superimposed on the map image IMG in such a manner that the capturing directions of the cameras CA6, CA7, CA8, and CA9 are corrected so as to be directed to a bottom-right position, a top-right position, bottom-left position, and a top-left position, respectively.

As described above, in the camera setting assist system 100C according to the third modification of the first embodiment, the server S1 compares a capturing area of a camera and a position of a subject model IMG with a received map image. If the entire capturing area of a camera and a subject model IMG are located outside the map image when the camera is selected, the installation direction of the camera is corrected so that the capturing area of the camera and the subject model IMG are located in the map image and a corrected capturing area of the camera and a corrected subject model IMG are superimposed on the map image. With this measure, in the camera setting assist system 100C according to the third modification of the first embodiment, a camera installation direction that is directed to outside a map image in which a capturing area of the camera should be placed can be corrected and hence time and labor that are required for a user to correct the camera installation direction can be saved.

The first embodiment and its modifications have been described above. It is noted that the concepts of the first embodiment and its first, second, and third modifications can be implemented at the same time in the same camera setting assist system.

Although the embodiment has been described above with reference to the drawings, it goes without saying that the disclosure is not intended to be limited to this example of the disclosure. It is apparent that those skilled in the art could conceive various changes, modifications, replacements, additions, deletions, or equivalents within the confines of the claims, and they are construed as being included in the technical scope of the disclosure.

The present disclosure is useful in providing camera setting assist systems that assist a user in checking a specification relating to the image quality of an image captured by a camera by presenting a captured image that is suitable for an environment in which to install the camera.

The present application is based upon Japanese Patent Application (Patent Application No. 2019-163100 filed on Sep. 6, 2019), the content of which is incorporated herein by reference.

What is claimed is:

1. A camera setting assist system comprising:
a terminal apparatus configured to receive an input manipulation of a user; and
a server that is communicatively connected to the terminal apparatus, wherein:
the terminal apparatus transmits, to the server, setting information including specification information of a camera based on the input manipulation of the user, environment information indicating an environment in which the camera is installed, and a map image of a place where the camera is installed;
in a case where the environment information indicates the camera is installed in an outdoor environment, the environment information indicates an environment condition selected from a first environment condition in which the environment is a first time period during a day, and second environment condition in which the environment is a second time period during the day;
in a case where the environment information indicates the camera is installed in an indoor environment, the environment information indicates another environment condition selected from a third environment condition in which the environment includes illumination, and a fourth environment condition in which the environment does not include illumination;
the server
calculates a capturing area of the camera in the map image based on the setting information and the environment information;
places a subject model that serves as a capturing target of the camera at a prescribed position in the capturing area and generates a synthesized image by superimposing the capturing area and the subject model on the map image;
generates a face image of the subject model located at the prescribed position that is inferred to be captured by the camera based on the setting information and the environment information; and
transmits the synthesized image and the face image of the subject model to the terminal apparatus; and
the terminal apparatus displays the synthesized image and the face image of the subject model.

2. The camera setting assist system according to claim 1, wherein:
the server generates, when a vehicle is placed at the prescribed position that is inferred to be captured by the camera, a license plate image of the vehicle based on the setting information and the environment information, and transmits the license plate image to the terminal apparatus; and
the terminal apparatus displays the license plate image.

3. The camera setting assist system according to claim 2, wherein:
the server generates the face image and the license plate image that are captured by a camera that is selected by a manipulation performed on the terminal apparatus by the user and transmits the face image and the license plate image to the terminal apparatus; and
the terminal apparatus displays the face image and the license plate image.

4. The camera setting assist system according to claim 1, wherein:
the server generates a synthesized image in which a color of a capturing area of a camera selected among one or more cameras by a manipulation performed on the terminal apparatus by the user is changed.

5. The camera setting assist system according to claim 1, wherein:
the server
acquires values of a setting parameter that are set stepwise for each use of the camera based on use information of the camera that is included in the setting information; and
calculates capturing areas corresponding to the respective values of the setting parameter.

6. The camera setting assist system according to claim 5, wherein
the setting parameter includes pixel density of the camera.

7. The camera setting assist system according to claim 5, wherein
the setting parameter includes illuminance that is an item of the environment information.

8. The camera setting assist system according to claim 1, wherein:
the server
compares the capturing area of the camera and the prescribed position of the subject model with the map image; and
when an entire capturing area of the camera and the subject model are located outside the map image by selection of the camera, corrects an installation direction of the camera so that the capturing area of the camera and the subject model are corrected to be located in the map image and superimposes the corrected capturing area and subject model on the map image.

9. The camera setting assist system according to claim 1, wherein:
the server converts the setting information of the camera into setting information in comma-separated values (CSV) data form and transmits the setting information in CSV data form to the terminal apparatus; and
the terminal apparatus outputs the setting information in CSV data form of the camera.

10. The camera setting assist system according to claim 1, wherein:
the server superimposes an icon indicating a position of the camera on the map image.

11. The camera setting assist system according to claim 1, wherein:
in a case where the environment condition is the first environment condition, the environment information indicates another environment condition selected from a fifth environment condition in which the environment is a first weather condition, and a sixth environment condition in which the environment is a second whether condition; and
in a case where the environment condition is the second environment condition, the environment information indicates another environment condition selected from a seventh environment condition in which the environment includes a light source, and a eighth environment condition in which the environment does not include a light source.

12. The camera setting assist system according to claim 1, wherein:
pixel density of the face image is dependent on a distance between the prescribed position and the camera, and
brightness of the face image is dependent on an illuminance of the environment in which the camera is installed.

13. The camera setting assist system according to claim 1, wherein:
the specification information of the camera includes camera installation angle information and camera pixel density information.

14. A camera setting assist method performed by a terminal apparatus configured to receive an input manipulation of a user and a server that is communicatively connected to the terminal apparatus, the camera setting assist method comprising:
calculating a capturing area of a camera in a map image of a place where the camera is installed based on setting information including specification information of the camera based on the input manipulation of the user and environment information indicating an environment in which the camera is installed, wherein
in a case where the environment information indicates the camera is installed in an outdoor environment, the environment information indicates an environment condition selected from a first environment condition in which the environment is a first time period during a day, and second environment condition in which the environment is a second time period during the day;
in a case where the environment information indicates the camera is installed in an indoor environment, the environment information indicates another environment condition selected from a third environment condition in which the environment includes illumination, and a fourth environment condition in which the environment does not include illumination;
placing a subject model that serves as a capturing target of the camera at a prescribed position in the capturing area and generating a synthesized image by superimposing the capturing area and the subject model on the map image;
generating a face image of the subject model located at the prescribed position that is inferred to be captured by the camera based on the setting information and the environment information; and
displaying the synthesized image and the face image of the subject model.

15. The camera setting assist system according to claim 1, wherein:
the server
generates a whole body image of the subject model located at the prescribed position that is inferred to be captured by the camera based on the setting information and the environment information; and
transmits the whole body image of the subject model to the terminal apparatus; and
the terminal apparatus displays the whole body image of the subject model.

16. A camera setting assist system comprising:
a terminal apparatus configured to receive an input manipulation of a user; and
a server that is communicatively connected to the terminal apparatus, wherein:
the terminal apparatus transmits, to the server, setting information including specification information of a camera based on the input manipulation of the user, environment information indicating an environment in which the camera is installed, and a map image of a place where the camera is installed;
the environment information indicates an environment condition selected from a first environment condition in which the environment is a first time period during a day, and second environment condition in which the environment is a second time period during the day;
in a case where the environment condition is the first environment condition, the environment information indicates another environment condition selected from a third environment condition in which the environment is a first weather condition, and a fourth environment condition in which the environment is a second whether condition;

in a case where the environment condition is the second environment condition, the environment information indicates another environment condition selected from a fifth environment condition in which the environment includes a light source, and a sixth environment condition in which the environment does not include a light source;

the server
- calculates a capturing area of the camera in the map image based on the setting information and the environment information;
- places a subject model that serves as a capturing target of the camera at a prescribed position in the capturing area and generates a synthesized image by superimposing the capturing area and the subject model on the map image;
- generates a face image of the subject model located at the prescribed position that is inferred to be captured by the camera based on the setting information and the environment information; and
- transmits the synthesized image and the face image of the subject model to the terminal apparatus; and the terminal apparatus displays the synthesized image and the face image of the subject model.

17. A camera setting assist method performed by a terminal apparatus configured to receive an input manipulation of a user and a server that is communicatively connected to the terminal apparatus, the camera setting assist method comprising:

calculating a capturing area of a camera in a map image of a place where the camera is installed based on setting information including specification information of the camera based on the input manipulation of the user and environment information indicating an environment in which the camera is installed, wherein the environment information indicates an environment condition selected from a first environment condition in which the environment is a first time period during a day, and second environment condition in which the environment is a second time period during the day;

in a case where the environment condition is the first environment condition, the environment information indicates another environment condition selected from a third environment condition in which the environment is a first weather condition, and a fourth environment condition in which the environment is a second whether condition; and in a case where the environment condition is the second environment condition, the environment information indicates another environment condition selected from a fifth environment condition in which the environment includes a light source, and a sixth environment condition in which the environment does not include a light source;

placing a subject model that serves as a capturing target of the camera at a prescribed position in the capturing area and generating a synthesized image by superimposing the capturing area and the subject model on the map image;

generating a face image of the subject model located at the prescribed position that is inferred to be captured by the camera based on the setting information and the environment information; and displaying the synthesized image and the face image of the subject model.

* * * * *